(12) United States Patent
Zhao et al.

(10) Patent No.: US 12,267,809 B2
(45) Date of Patent: Apr. 1, 2025

(54) WIRELESS COMMUNICATION METHOD AND APPARATUS

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/818,339

(22) Filed: Aug. 28, 2024

(65) Prior Publication Data

US 2024/0422737 A1 Dec. 19, 2024

Related U.S. Application Data

(63) Continuation of application No. PCT/CN2022/075175, filed on Jan. 30, 2022.

(51) Int. Cl.
*H04W 68/02* (2009.01)

(52) U.S. Cl.
CPC .................. *H04W 68/02* (2013.01)

(58) Field of Classification Search
CPC ....................................................... H04W 68/02
USPC ......................................................... 455/458
See application file for complete search history.

(56) References Cited

U.S. PATENT DOCUMENTS 10,798,678 B2 10/2020 Rune et al.
2022/0124674 A1* 4/2022 Babaei .................. H04W 68/02

FOREIGN PATENT DOCUMENTS

| CN | 109792710 | 5/2019 |
|---|---|---|
| CN | 110474708 | 11/2019 |
| CN | 111356216 | 6/2020 |
| CN | 113170282 | 7/2021 |
| CN | 113225696 | 8/2021 |
| CN | 113366894 | 9/2021 |
| CN | 113784433 | 12/2021 |
| CN | 113875312 | 12/2021 |
| KR | 20210090549 | 7/2021 |

(Continued)

OTHER PUBLICATIONS

CATT, "UE sub-grouping mechanism with Paging Enhancement," 3GPP TSG-RAN WG2 Meeting #113 electronic, R2-2100298, Online, Jan. 25-Feb. 5, 2021, 4 pages.

(Continued)

*Primary Examiner* — Joel Ajayi
(74) *Attorney, Agent, or Firm* — Fish & Richardson P.C.

(57) ABSTRACT

Provided are a wireless communication method and apparatus. One example method includes: receiving, by a first terminal device, a first paging early indication (PEI), wherein the first terminal device belongs to a first subgroup and a second subgroup, and the first PEI comprises an indication indicating whether to perform paging detection by the first subgroup and whether to perform paging detection based on the second subgroup; and determining, by the first terminal device based on the indication, whether to perform paging detection based on at least one of the first subgroup or the second subgroup, wherein the first subgroup corresponds to a radio access network (RAN)-initiated paging message, and the second subgroup corresponds to a core network (CN)-initiated paging message.

18 Claims, 7 Drawing Sheets

(56) References Cited

FOREIGN PATENT DOCUMENTS

| WO | WO 2021175032 | 9/2021 |
|----|---------------|--------|
| WO | WO 2021180206 | 9/2021 |
| WO | WO 2021235860 | 11/2021 |
| WO | WO 2021238993 | 12/2021 |
| WO | WO 2022007844 | 1/2022 |
| WO | WO 2022007876 | 1/2022 |

OTHER PUBLICATIONS

Huawei et al., "Detailed design on paging subgrouping," 3GPP TSG-RAN WG2 Meeting #116 electronic, R2-2110539, Online, Nov. 1-12, 2021, 9 pages.

International Search Report and Written Opinion in International Appln. No. PCT/CN2022/075175, mailed on Sep. 26, 2022, 22 pages (with English translation).

MediaTek Inc., "UE Paging Subgroup Assignment," 3GPP TSG-RAN WG2 Meeting #116 electronic, R2-2110967, Online, Nov. 1-12, 2021, 9 pages.

MediaTek Inc., "UE-Group Paging Early Indication," 3GPP TSG-RAN WG2 Meeting #113 electronic. R2-2101539, Online, Jan. 25-Feb. 5, 2021, 4 pages.

Office Action in Chinese Appln. No. 202280002774.0, mailed on Aug. 26, 2024, 33 pages (with English machine translation).

Office Action in Chinese Appln. No. 202280002774.0, mailed on Mar. 14, 2024, 45 pages (with English machine translation).

Xiaomi Communications, "Discussion on paging enhancement" 3GPP TSG-RAN WG2 Meeting #113e, R2-2100390, Online, Jan. 25-Feb. 5, 2021, 5 pages.

Extended European Search Report in European Appln. No. 22922934.9, mailed on Feb. 17, 2025, 15 pages.

Huawei et al., "Paging enhancements for idle/inactive-mode UE," 3GPP TSG-RAN WG2 Meeting #113 electronic, R2-2101274, Online, Jan. 25-Feb. 5, 2021, 9 pages.

Huawei et al., "PEI configuration and monitoring," 3GPP TSG-RAN WG2 Meeting #116-bis electronic, R2-2201155, Online, Jan. 17-25, 2022, 9 pages.

\* cited by examiner

| PEI | | | | | | | |
|---|---|---|---|---|---|---|---|
| PEI indication for subgroup 1 | PEI indication for subgroup 2 | PEI indication for subgroup 3 | PEI indication for subgroup 4 | PEI indication for subgroup 5 | PEI indication for subgroup 6 | PEI indication for subgroup 7 | PEI indication for subgroup 8 |

FIG. 4

WIRELESS COMMUNICATION METHOD AND APPARATUS

CROSS-REFERENCE TO RELATED APPLICATIONS

This application is a continuation of International Application No. PCT/CN2022/075175, filed on Jan. 30, 2022, the disclosure of which is hereby incorporated by reference in its entirety.

TECHNICAL FIELD

The present application relates to the field of communications technologies, and more specifically, to a wireless communication method and apparatus.

BACKGROUND

A terminal device may use a plurality of methods to determine a subgroup to which the terminal device belongs, and thus may determines a plurality of subgroup sequence numbers. In this case, the terminal device may be confused about the subgroup. For example, the terminal device does not know which subgroup sequence number from a paging early indication (paging early indication, PEI) is to be used for subsequent processing.

SUMMARY

In view of the foregoing problem, the present application provides a wireless communication method and apparatus.

According to a first aspect, a wireless communication method is provided, and the method includes: receiving, by a first terminal device, a first PEI, where the first terminal device belongs to a first subgroup and a second subgroup, and the first PEI is used to indicate whether to perform paging detection by the first subgroup and the second subgroup; and determining, by the first terminal device based on an indication that is in the first PEI and indicates whether to perform paging detection by a target subgroup, whether to perform paging detection, where the target subgroup is the first subgroup and/or the second subgroup.

According to a second aspect, a wireless communication method is provided, and the method includes: receiving, by the first terminal device, a first PEI, where the first PEI is used to indicate whether to perform paging detection by at least one subgroup, and the at least one subgroup includes a first subgroup. A sequence number of the first subgroup is determined based on at least one of: an ID of the first terminal device, an indication from a base station, or an indication from a core network device.

According to a third aspect, a wireless communication method is provided, and the method includes: receiving, by a first terminal device, a first PEI, where the first PEI includes a plurality of pieces of indication information, the plurality of pieces of indication information are respectively used to indicate whether to perform paging detection by a plurality of subgroups, and the first terminal device belongs to the plurality of subgroups; and in a case that one of the plurality of pieces of indication information indicates performing paging detection by the first terminal device, performing, by the first terminal device, paging detection in one or more POs corresponding to the plurality of pieces of indication information.

According to a fourth aspect, a wireless communication method is provided, and the method includes: receiving, by a first terminal device, first indication information, where the first indication information is used to instruct to enable or disable a PEI.

According to a fifth aspect, a wireless communication method is provided, and the method includes: transmitting, by a base station, a first PEI, where a first terminal device belongs to a first subgroup and a second subgroup, and the first PEI is used to indicate whether to perform paging detection by the first subgroup and the second subgroup; and determining, by the base station based on an indication that is in the first PEI and indicates whether to perform paging detection by a target subgroup, whether to perform paging detection by the first terminal device, where the target subgroup is the first subgroup and/or the second subgroup.

According to a sixth aspect, a wireless communication method is provided, and the method includes: transmitting, by a base station, a first PEI, where the first PEI is used to indicate whether to perform paging detection by at least one subgroup, and the at least one subgroup includes a first subgroup. A sequence number of the first subgroup is determined based on at least one of: an ID of the first terminal device, an indication from a base station, or an indication from a core network device.

According to a seventh aspect, a wireless communication method is provided, and the method includes: transmitting, by a base station, a first PEI, where the first PEI includes a plurality of pieces of indication information, the plurality of pieces of indication information are respectively used to indicate whether to perform paging detection by a plurality of subgroups, and the first terminal device belongs to the plurality of subgroups; and in a case that one of the plurality of pieces of indication information indicates performing paging detection by the first terminal device, determining, by the base station, to perform paging detection by the first terminal device in one or more POs corresponding to the plurality of pieces of indication information.

According to an eighth aspect, a wireless communication method is provided, and the method includes: transmitting, by a base station, first indication information to a first terminal device, where the first indication information is used to instruct to enable or disable a PEI.

According to a ninth aspect, a wireless communications apparatus is provided, and the apparatus includes: a receiving module, receiving a first PEI, where the first terminal device belongs to a first subgroup and a second subgroup, and the first PEI is used to indicate whether to perform paging detection by the first subgroup and the second subgroup; and a determining module, determining, by the first terminal device based on an indication that is in the first PEI and indicates whether to perform paging detection by a target subgroup, whether to perform paging detection, where the target subgroup is the first subgroup and/or the second subgroup.

According to a tenth aspect, a wireless communications apparatus is provided, and the apparatus includes: a receiving module, receiving a first PEI, where the first PEI is used to indicate whether to perform paging detection by at least one subgroup, and the at least one subgroup includes a first subgroup. A sequence number of the first subgroup is determined based on at least one of: an ID of the first terminal device, an indication from a base station, or an indication from a core network device.

According to an eleventh aspect, a wireless communications apparatus is provided, and the apparatus includes a receiving module, receiving a first PEI, where the first PEI includes a plurality of pieces of indication information. The plurality of pieces of indication information are respectively used to indicate whether to perform paging detection by a plurality of subgroups, and the first terminal device belongs to the plurality of subgroups; and a detection module, performing paging detection in one or more POs corresponding to the plurality of pieces of indication information in a case that one of the plurality of pieces of indication information indicates performing paging detection by the first terminal device.

According to a twelfth aspect, a wireless communications apparatus is provided, and the apparatus includes a receiving module, receiving first indication information, where the first indication information is used to instruct to enable or disable a PEI.

According to a thirteenth aspect, a wireless communications apparatus is provided, and the apparatus includes: a transmitting module, transmitting a first PEI, where the first terminal device belongs to a first subgroup and a second subgroup, and the first PEI is used to indicate whether to perform paging detection by the first subgroup and the second subgroup; and a determining module, determining, based on an indication that is in the first PEI and indicates whether to perform paging detection by a target subgroup, whether to perform paging detection by the first terminal device, where the target subgroup is the first subgroup and/or the second subgroup.

According to a fourteenth aspect, a wireless communications apparatus is provided, and the apparatus includes: a transmitting module, transmitting a first PEI, where the first PEI is used to indicate whether to perform paging detection by at least one subgroup, and the at least one subgroup includes a first subgroup. A sequence number of the first subgroup is determined based on at least one of: an ID of the first terminal device, an indication from a base station, or an indication from a core network device.

According to a fifteenth aspect, a wireless communications apparatus is provided, and the apparatus includes: a transmitting module, transmitting a first PEI, where the first PEI includes a plurality of pieces of indication information, and the plurality of pieces of indication information are respectively used to indicate whether to perform paging detection by a plurality of subgroups, and the first terminal device belongs to the plurality of subgroups; and a determining module, determining to perform paging detection by the first terminal device in one or more POs corresponding to the plurality of pieces of indication information, in a case that one of the plurality of pieces of indication information indicates performing paging detection by the first terminal device.

According to a sixteenth aspect, a wireless communications apparatus is provided, and the apparatus includes a transmitting module, transmitting first indication information to a first terminal device, where the first indication information is used to instruct to enable or disable a PEI.

According to a seventeenth aspect, a wireless communications apparatus is provided, and the apparatus includes a memory and a processor, where the memory is configured to store a program, and the processor is configured to invoke the program from the memory to perform the method according to any one of the first aspect to the eighth aspect.

According to an eighteenth aspect, an apparatus is provided, and the apparatus includes a processor configured to invoke the program from the memory to perform the method according to any one of the first aspect to the eighth aspect.

According to an eleventh aspect, a chip is provided, where the chip includes a processor configured to invoke a program from a memory to cause a device installed with the chip to perform the method according to any one of the first aspect to the fourth aspect.

According to a twentieth aspect, a computer-readable storage medium is provided, and the computer-readable storage medium stores a program that causes a computer to perform the method according to any one of the first aspect to the eighth aspect.

According to a twenty-first aspect, a computer program product is provided, and the computer program product includes a program that causes a computer to perform the method according to any one of the first aspect to the eighth aspect.

According to a twenty-second aspect, a computer program is provided, where the computer program causes a computer to perform the method according to any one of the first aspect to the eighth aspect.

BRIEF DESCRIPTION OF THE DRAWINGS

FIG. 4 is a schematic diagram of a PEI for paging indication according to an embodiment of the present application.

DETAILED DESCRIPTION OF THE EMBODIMENTS

Communications System Architecture

Figure 1A:
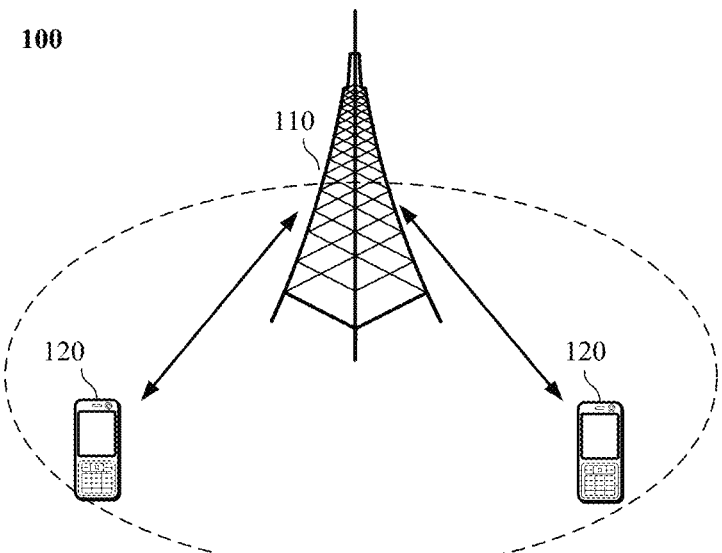
FIG. 1A to FIG. 1C are system architectural diagrams of communications systems to which embodiments of the present application are applicable.

The technical solutions in embodiments of the present application may be applied to various communications systems, for example, a global system for mobile communications (global system of mobile communication, GSM), a code-division multiple access (code division multiple access, CDMA) system, a wideband code-division multiple access (wideband code division multiple access, WCDMA) system, general packet radio service (general packet radio service, GPRS), a long-term evolution (long term evolution, LTE) system, an advanced long-term evolution (advanced long term evolution, LTE-A) system, a new radio (new radio, NR) system, an evolved system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, an NTN system, a universal mobile telecommunications system (universal mobile telecommunication system, UMTS), a wireless local area network (wireless local area networks, WLAN), wireless fidelity (wireless fidelity, WiFi), a fifth-generation (5th-generation, 5G) system, or another communications system, for example, a future communications system such as a sixth-generation mobile communications system or a satellite communications system.

Generally, a quantity of connections supported by a conventional communications system is limited, and is also easy to implement. However, with development of communication technologies, a mobile communications system not only supports conventional communication, but also supports, for example, device-to-device (device to device, D2D) communication, machine-to-machine (machine to machine, M2M) communication, machine type communication (machine type communication, MTC), vehicle-to-vehicle (vehicle to vehicle, V2V) communication, or Internet of vehicles (vehicle to everything, V2X) communication. Embodiments of the present application may also be applied to these communications systems.

The communications system in embodiments of the present application may be applied to a carrier aggregation (carrier aggregation, CA) scenario, may be applied to a dual connectivity (dual connectivity, DC) scenario, or may be applied to a standalone (standalone, SA) networking scenario.

The communications system in embodiments of the present application may be applied to an unlicensed spectrum, and the unlicensed spectrum may also be considered as a shared spectrum. Alternatively, the communications system in embodiments of the present application may be applied to a licensed spectrum, and the licensed spectrum may also be considered as a dedicated spectrum.

Embodiments of the present application may be applied to an NTN system, or may be applied to a terrestrial communication network (terrestrial networks, TN) system. As an example rather than limitation, the NTN system includes an NR-based NTN system and an IoT-based NTN system.

Embodiments of the present application are described with reference to a network device and a terminal device. The terminal device may also be referred to as a user equipment (user equipment, UE), an access terminal, a subscriber unit, a subscriber station, a mobile site, a mobile station (mobile station, MS), a mobile terminal (mobile terminal, MT), a remote station, a remote terminal, a mobile device, a user terminal, a terminal, a wireless communications device, a user agent, or a user apparatus.

In embodiments of the present application, the terminal device may be a station (STATION, ST) in a WLAN, a cellular phone, a cordless phone, a session initiation protocol (session initiation protocol, SIP) phone, a wireless local loop (wireless local loop, WLL) station, a personal digital assistant (personal digital assistant, PDA) device, a handheld device with a wireless communication function, a computing device or another processing device connected to a wireless modem, a vehicle-mounted device, a wearable device, a terminal device in a next-generation communications system such as an NR network, a terminal device in a future evolved public land mobile network (public land mobile network, PLMN), or the like.

The terminal device in embodiments of the present application may be a device providing a user with voice and/or data connectivity and capable of connecting people, objects, and machines, such as a handheld device or vehicle-mounted device having a wireless connection function. The terminal device in embodiments of the present application may be a mobile phone (mobile phone), a tablet computer (Pad), a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), or the like. Optionally, the terminal device may be configured to serve as a base station. For example, the terminal device may function as a scheduling entity, which provides a sidelink signal between terminal devices in V2X, D2D, or the like. For example, a cellular phone and a vehicle communicate with each other by using a sidelink signal. A cellular phone and a smart home device communicate with each other, without relay of a communication signal through a base station.

In embodiments of the present application, the terminal device may be deployed on land, including being indoors or outdoors, may be handheld, wearable, or vehicle-mounted, may be deployed on water (for example, on a ship), or may be deployed in the air (for example, on an airplane, a balloon, or a satellite).

In embodiments of the present application, the terminal device may be a mobile phone (mobile phone), a pad (pad), a computer with a wireless transceiver function, a virtual reality (virtual reality, VR) terminal device, an augmented reality (augmented reality, AR) terminal device, a wireless terminal device in industrial control (industrial control), a wireless terminal device in self driving (self driving), a wireless terminal device in remote medical (remote medical), a wireless terminal device in smart grid (smart grid), a wireless terminal device in transportation safety (transportation safety), a wireless terminal device in smart city (smart city), or a wireless terminal device in smart home (smart home), or the like. The terminal device involved in embodiments of the present application may also be referred to as a terminal, a user equipment (user equipment, UE), an access terminal device, a vehicle-mounted terminal, an industrial control terminal, a UE unit, a UE station, a mobile site, a mobile station, a remote station, a remote terminal device, a mobile device, a UE terminal device, a wireless communications device, a UE agent, a UE apparatus, or the like. The terminal device may also be stationary or mobile.

By way of example rather than limitation, in embodiments of the present application, the terminal device may alternatively be a wearable device. The wearable device may also be referred to as an intelligent wearable device, and is a general term of wearable devices such as glasses, gloves, watches, clothes, and shoes intelligently designed and developed based on daily wearing by using a wearable technology. The wearable device is a portable device that can be directly worn or integrated into clothes or accessories of a user. In addition to being a hardware device, the wearable device can also realize various functions through software support, data interaction, and cloud interaction. In a broad sense, smart wearable devices include a full-featured and large-sized device that can provide full or partial functions without relying on a smart phone, for example, a smart watch or smart glasses, and devices that focus on only a specific type of application function and need to cooperate with another device such as a smart phone for use, for example, various smart bracelets and smart jewelry for physical sign monitoring.

The network device in embodiments of the present application may be a device configured to communicate with the terminal device. The network device may also be referred to as an access network device or a wireless access network device. For example, the network device may be a base station. The network device in embodiments of the present application may be a radio access network (radio access network, RAN) node (or device) that connects the terminal device to a wireless network. The base station may broadly cover the following various names, or may be replaced with the following names, such as a Node B (NodeB), an evolved NodeB (evolved NodeB, eNB), a next-generation NodeB (next generation NodeB, gNB), a relay station, an access point, a transmitting and receiving point (transmitting and receiving point, TRP), a transmitting point (transmitting point, TP), a master eNodeB MeNB, a secondary eNodeB SeNB, a multi-standard radio (MSR) node, a home eNodeB, a network controller, an access node, a radio node, an access point (access point, AP), a transmission node, a transceiver node, a baseband unit (base band unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), and a positioning node. The base station may be a macro base station, a micro base station, a relay node, a donor node, or the like, or a combination thereof.

Alternatively, the base station may be a communications module, a modem, or a chip disposed in the device or apparatus described above. Alternatively, the base station may be a mobile switching center, a device that functions as a base station in device to device D2D, vehicle-to-everything (vehicle-to-everything, V2X), and machine-to-machine (machine-to-machine, M2M) communications, a network-side device in a 6G network, a device that functions as a base station in a future communications system, or the like. The base station may support networks with a same access technology or different access technologies. A specific technology and specific device form used by the network device are not limited in embodiments of the present application.

The base station may be stationary, or may be mobile. For example, a helicopter or an unmanned aerial vehicle may be configured to act as a mobile base station, and one or more cells may move depending on a location of the mobile base station. In other examples, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

The network device and the terminal device may be deployed on land, including being indoors or outdoors, handheld, or vehicle-mounted, may be deployed on a water surface, or may be deployed on a plane, a balloon, or a satellite in the air. In embodiments of the present application, a scenario of the network device and the terminal device is not limited.

By way of example rather than limitation, in embodiments of the present application, the network device may have a mobility characteristic. For example, the network device may be a mobile device. In some embodiments of the present application, the network device may be a satellite or a balloon station. For example, the satellite may be a low-earth orbit (low earth orbit, LEO) satellite, a medium-earth orbit (medium earth orbit, MEO) satellite, a geostationary earth orbit (geostationary earth orbit, GEO) satellite, a high elliptical orbit (High Elliptical Orbit, HEO) satellite, or the like. In some embodiments of the present application, the network device may alternatively be a base station disposed in a location such as land or water.

In embodiments of the present application, the network device may provide a service for a cell. The terminal device communicates with the network device by using a transmission resource (for example, a frequency resource or a spectrum resource) used by the cell. The cell may be a cell corresponding to the network device (for example, a base station). The cell may belong to a macro station or may belong to a base station corresponding to a small cell (small cell). The small cell herein may include a metro cell (metro cell), a micro cell (micro cell), a pico cell (pico cell), a femto cell (femto cell), or the like. These small cells have characteristics of a small coverage range and low transmit power, and are suitable for providing a high-rate data transmission service.

For example, FIG. 1A is a schematic diagram of an architecture of a communications system according to an embodiment of the present application. As shown in FIG. 1A, the communications system 100 may include a network device 110, and the network device 110 may be a device that communicates with a terminal device 120 (or referred to as a communications terminal or a terminal). The network device 110 may provide communication coverage in a specific geographic area, and may communicate with a terminal device located in the coverage area.

FIG. 1A exemplarily shows one network device and two terminal devices. In some embodiments of the present application, the communications system 100 may include a plurality of network devices, and another quantity of terminal devices may be included within a coverage range of each network device, which is not limited in embodiments of the present application.

Figure 1B:
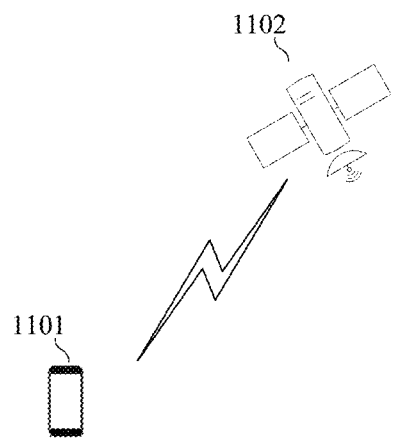

For example, FIG. 1B is a schematic diagram of an architecture of another communications system according to an embodiment of the present application. Referring to FIG. 1B, a terminal device 1101 and a satellite 1102 are included, and wireless communication may be performed between the terminal device 1101 and the satellite 1102. A network formed between the terminal device 1101 and the satellite 1102 may also be referred to as an NTN. In the architecture of the communications system shown in FIG. 1B, the satellite 1102 may have a function of a base station, and direct communication may be performed between the terminal device 1101 and the satellite 1102. Under this system architecture, the satellite 1102 may be referred to as a network device. In some embodiments of the present application, the communications system may include a plurality of network devices 1102, and another quantity of terminal devices may be included within a coverage range of each network device 1102, which is not limited in embodiments of the present application.

Figure 1C:
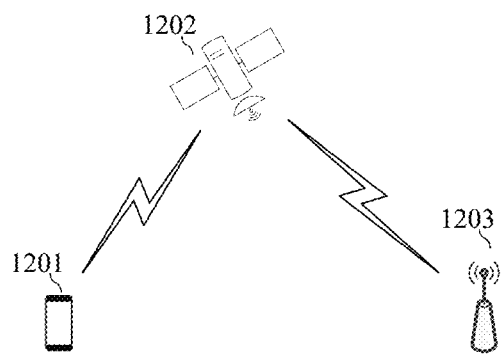

For example, FIG. 1C is a schematic diagram of an architecture of another communications system according to an embodiment of the present application. Referring to FIG. 1C, a terminal device 1201, a satellite 1202, and a base station 1203 are included, wireless communication may be performed between the terminal device 1201 and the satellite 1202, and communication may be performed between the satellite 1202 and the base station 1203. A network formed between the terminal device 1201, the satellite 1202, and the base station 1203 may also be referred to as an NTN. In the architecture of the communications system shown in FIG. 1C, the satellite 1202 may not have a function of a base station, and communication between the terminal device 1201 and the base station 1203 needs to be relayed by using the satellite 1202. Under such a system architecture, the base station 1203 may be referred to as a network device. In some embodiments of the present application, the communications system may include a plurality of network devices 1203, and another quantity of terminal devices may be included within a coverage range of each network device 1203, which is not limited in embodiments of the present application.

It should be noted that FIG. 1A to FIG. 1C are merely examples of systems to which the present application applies. Certainly, the methods shown in embodiments of the present application may also be applied to another system, such as a 5G communications system or an LTE communications system. This is not specifically limited in embodiments of the present application.

In some embodiments of the present application, the wireless communications systems shown in FIG. 1A to FIG. 1C may further include another network entity such as a mobility management entity (mobility management entity, MME) or an access and mobility management function (access and mobility management function, AMF), which is not limited in embodiments of the present application.

It should be understood that a device having a communication function in a network/system in embodiments of the present application may be referred to as a communications device. The communications system 100 shown in FIG. 1A is used as an example. The communications device may include a network device 110 and a terminal device 120 that have a communication function. The network device 110 and the terminal device 120 may be the foregoing specific devices, and details are not described herein again. The communications device may further include another device in the communications system 100, such as a network controller, a mobility management entity, or another network entity. This is not limited in embodiments of the present application.

It should be understood that, the "indication" mentioned in embodiments of the present application may be a direct indication or an indirect indication, or indicate an association. For example, if A indicates B, it may mean that A directly indicates B, for example, B can be obtained from A. Alternatively, it may mean that A indicates B indirectly, for example, A indicates C, and B can be obtained from C. Alternatively, it may mean that there is an association between A and B.

In description of the embodiments of the present application, the term "corresponding" may mean that there is a direct or indirect correspondence between two items, or may mean that there is an association relationship between two items, or may mean that there is a relationship such as indicating and being indicated, or configuring and being configured.

"Configured" in embodiments of the present application may include being configured by using at least one of a system message, radio resource control (radio resource control, RRC) signalling, or a medium access control control element (media access control control element, MAC CE).

In some embodiments of the present application, the "predefined" or "preset" may be implemented in a manner in which corresponding code, a table, or other related information that may be used for indication is pre-stored in a device (for example, including a terminal device and a network device). A specific implementation thereof is not limited in the present application. For example, being predefined may refer to being defined in a protocol.

In some embodiments of the present application, the "protocol" may refer to a standard protocol in the communication field, which may include, for example, an LTE protocol, an NR protocol, and a related protocol applied to a future communications system. This is not limited in the present application.

For case of understanding, some related technical knowledge related to embodiments of the present application is first introduced. The following related technologies, as optional solutions, may be randomly combined with the technical solutions of the embodiments of the present application, all of which fall within the protection scope of the embodiments of the present application. Embodiments of the present application include at least part of the following content.

With people's pursuit of rate, delay, high-speed mobility, energy efficiency, and the diversity and complexity of services in future life, the international organization for standardization, that is, the 3rd generation partnership project (3rd generation partnership project, 3GPP) for mobile communications, has started developing 5G. Main application scenarios of 5G may include: enhanced mobile broadband (enhance mobile broadband, eMBB), ultra-reliable and low-latency communications (ultra reliable low latency communications, uRLLC), and massive machine type communication (massive machine type communication, mMTC). The solutions in embodiments of the present application may be applicable to any one of the foregoing scenarios.

Main characteristics of eMBB services include large data transmission volume and high transmission rate. For eMBB services, a scheduling unit of a relatively long time is generally used for the data transmission, so as to improve data transmission efficiency. Typical eMBB services may include ultra-high-definition video services, augmented reality (augmented reality, AR) services, virtual reality (virtual reality, VR) services, and the like.

Main characteristics of uRLLC services include high requirements for ultra-high reliability and ultra-low latency, small data transmission volume, and burst data transmission. For example, if not requiring reliability, a transmission delay of uRLLC services is generally required to be less than 0.5 milliseconds. If requiring the reliability to reach 99.999%, a transmission delay of uRLLC services is required to be less than 1 ms. Due to burstiness and randomness of uRLLC services, sometimes no data packet is generated for uRLLC services within a relatively long period of time, or sometimes a plurality of data packets are generated within a short period of time. In most cases, these data packets are small packets (for example, data packets with a size of 50 bytes). Typical uRLLC services may include wireless control in an industrial manufacturing or production process, and haptic interaction applications such as motion control and remote repair of a driverless vehicle or an unmanned aerial vehicle, and remote medical surgery.

Typical characteristics of mMTC services may include high connection density, small data volume, delay-insensitive services, low costs and long service life of modules. This scenario is primarily aimed at internet of things services, which poses extremely high requirements for an access capability of a network. Powerful connectivity of 5G can quickly facilitate deep integration of vertical industries (such as smart cities, smart home, and environmental monitoring). Under the internet of everything, people's lifestyles also undergo disruptive changes. In this scenario, data transmission is in a relatively low rate and is delay-insensitive, connections cover all aspects of life, terminals have lower costs, batteries have longer life and higher reliability, truly implementing the internet of everything.

RRC State

Some communications systems (for example, an NR system) introduce following three states for RRC: an RRC idle state (RRC_IDLE state), an RRC inactive state (RRC_INACTIVE state), and an RRC connected state (RRC_CONNECTED state). The foregoing three states reflect connection statuses of a terminal device, a base station and a core network (core network, CN).

A terminal device in the RRC idle state has no RRC context on a network side, that is, a parameter required for communication between the network side and the terminal device does not specify a cell, and the network side also does not learn whether the terminal device exists. A group of tracking area identifier (tracking area identifier, TAI) lists (list) is allocated to the terminal device. From the perspective of the core network, a connection between a RAN side and the core network is disconnected. To reduce power consumption, the terminal device is in a sleep state in most cases, and therefore, cannot perform data transmission. In a downlink, a terminal device in the RRC idle state may be periodically woken up to receive a paging message (if any) from the network side. Mobility may be processed by the terminal device through cell reselection. In the RRC idle state, uplink synchronization is not maintained between the terminal device and the network side. If the terminal device is to switch from the RRC idle state to the RRC connected state, an RRC context can be established between the terminal device and the network side only through random access.

In the RRC connected state, the RRC context may be established, and all parameters required for communication are known to both the entities (the terminal device and the network side). From a perspective of the core network, the terminal device is connected to the core network. A cell to which the terminal device belongs is known, and the terminal device has been configured with a device identity, namely, a cell-radio network temporary identifier (cell-radio network temporary identifier, C-RNTI) for transmission of signalling between the terminal device and the network. Data may be transmitted in the RRC connected state; however, because a data flow usually bursts, when there is no data flow for transmission, power consumption may be reduced by turning off a receiving circuit of the terminal device, and a discontinuous reception (discontinuous reception, DRX) technology is used. Because an RRC context has been established in the base station in the connected state, leaving DRX and starting to receive/transmit data are relatively fast. In the connected state, mobility may be controlled by the network side, that is, the terminal device provides neighboring cell measurement for the network, and the network instructs the device to perform switching. Uplink time synchronization may or may not be present. When there is data to be transmitted, uplink synchronization may be established through random access.

In LTE, only the RRC idle state and the RRC connected state are supported. It is common in practice to use the RRC idle state as a primary sleep state of the terminal device to save power. However, since frequent transmission of small data packets often occurs on some terminal devices, there may be a large quantity of transitions from the RRC idle state to the RRC connected state in the LTE mode. These transitions cause an increase in signalling load and signalling delay. Therefore, to reduce the signalling load and a waiting time, an RRC inactive state is introduced in NR.

In the RRC inactive state, an RRC context between the network side and a terminal device side is maintained. From the perspective of the core network, a RAN side is connected to the core network. Therefore, a transition from the inactive state to the connected state is very fast without requiring core network signalling. In addition, the terminal device is allowed to sleep in a manner similar to the RRC idle state, and mobility is processed through cell reselection. Therefore, the RRC inactive state may be considered as a mixture of the idle state and the connected state. In addition, the terminal device may perform the positioning measurement mentioned above in the RRC inactive state. When performing the positioning measurement in the RRC inactive state, the terminal device does not need to switch to the RRC connected state, so that overheads and a delay may be reduced.

As may be seen from the foregoing descriptions, an important difference between different RRC states lies in different mobility mechanisms. Efficient mobility processing is a key part for each mobile communications system. For the RRC idle state and the RRC inactive state, mobility is processed by the terminal device through cell reselection, while for the RRC connected state, mobility is processed on the network side based on measurement of the terminal device.

Paging (Paging)

For a terminal device in an RRC idle state or an RRC inactive state, the terminal device may be switched to an RRC connected state by paging. A paging process may be triggered by a core network side to transmit a paging request to a terminal device in an RRC idle state or an RRC inactive state, or paging is triggered by an access network side to notify a terminal device in an inactive state to initiate a connection restoration process, or to instruct terminal devices in all states covered by the access network to receive system information update, or to instruct terminal devices in all states covered by the access network to receive alarm information transmitted by an earthquake and tsunami warning system (earthquake and tsunami warning system, ETWS) and the commercial mobile alert system (commercial mobile alert system, CMAS).

Figure 2:
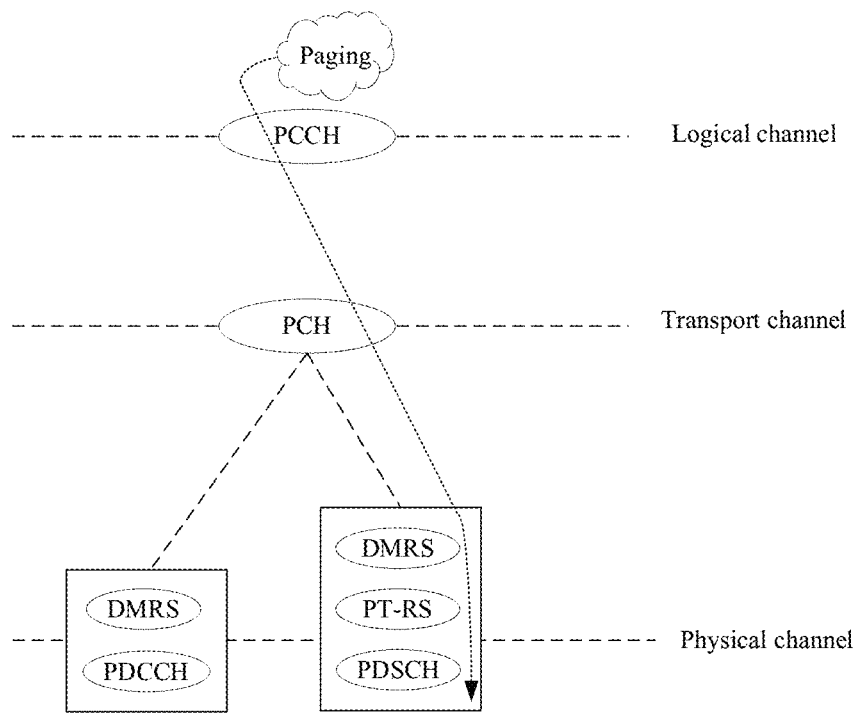
FIG. 2 is a diagram of paging logic.

FIG. 2 is a diagram of paging logic. As can be learned from FIG. 2, an entire paging process is mapped from a logical channel to a transport channel, and finally to a physical channel. A demodulation reference signal (demodulatin reference signal, DMRS) may be used for demodulation of uplink and downlink data.

The paging process may be initiated by a CN or initiated by a RAN (or a base station). The CN may be initiated by using an access and mobility management function (access and mobility management function, AMF) in the CN as an example. If a paging message is initiated by the CN, a core network device sends the paging message to all base stations in a tracking area (TA) registered by the terminal device. After receiving the paging message transmitted by the core network device, the base stations interpret content of the paging message to obtain a tracking area identity (tracking area identity, TAI) list of paged terminal devices, and perform air interface paging in a cell that belongs to a tracking area in the list. Generally, to reduce overheads of transmitting the paging message, after receiving the paging message transmitted by the core network device, the base station may aggregate paging messages corresponding to terminal devices having a same paging occasion (paging occasion, PO) into one paging message, and finally transmit the paging message to related terminal devices through a paging channel. After receiving the paging message, a terminal device in an RRC idle state may initiate an RRC connection setup process to receive data or signalling.

The paging message is carried over a physical downlink shared channel (physical downlink shared channel, PDSCH). Before receiving the paging message, the terminal device needs to first receive a paging parameter through a system message, and then calculate a frame number of a paging frame (paging frame, PF) in which the paging message is located and a PO by using the paging parameter in combination with its own UE_ID. Then, the terminal device listens to, in the PO on the PF, a physical downlink control channel (physical downlink control channel, PDCCH) scrambled by a P-RNTI, to receive paging indication information, and finally receives the paging message based on the paging indication information. It may be understood that the paging indication information is carried in the PDCCH, and the paging indication information may be used to indicate a resource location of a PDSCH that carries the paging message.

For example, the terminal device may detect a PDCCH in the PO to obtain downlink control information (downlink control information, DCI), where cyclic redundancy check (cyclic redundancy check, CRC) of the DCI is scrambled by the P-RNTI. If the DCI is detected, the terminal device may receive the PDSCH at a resource location (for example, a time resource location and/or a frequency resource location) indicated by the DCI. The terminal device may decode the PDSCH by using a temporary mobile subscriber identity (temporary mobile subscriber identity, TMSI) (for example, 5G-S-TMSI). If the decoding is successful, it indicates that the terminal device is paged and the terminal device obtains the paging message from the PDSCH. If the decoding fails, it indicates that the terminal device is not paged.

Figure 3:
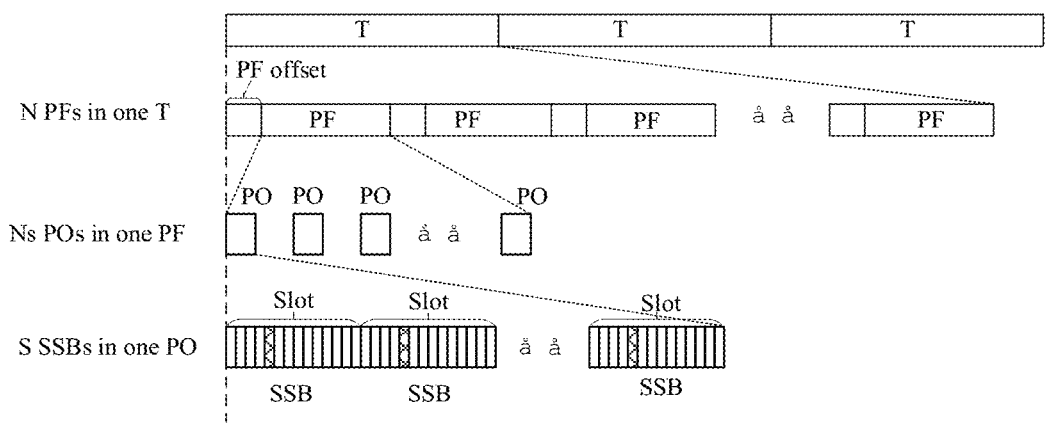
FIG. 3 is a schematic diagram of a relationship between a paging cycle, a paging frame, and a paging occasion.

The PF indicates a frame number of a system frame at which the paging message should appear, and the PO indicates a time at which the paging message may appear. FIG. 3 shows a location of a PF in a DRX cycle and a location of a PO in a PF. As shown in FIG. 3, a PF is located within a DRX cycle (or paging cycle (paging cycle)) T, one paging cycle includes N PFs, one PF includes Ns POs, and one PO includes S slots or synchronization signal block (synchronization signal block, SSB) beams, where N, Ns, and S are all positive integers. A plurality of POs in a same paging cycle may correspond to different terminal devices. However, for a specific terminal device, in one paging cycle, the terminal device only needs to monitor its own PO.

As described above, the terminal device may calculate a PF and a PO based on a UE identity (identity, ID). In some implementations, a system frame corresponding to a system frame number (system frame number, SFN) satisfying the formula (SFN+PF_offset) mod T=(T div N)*(UE_ID mod N) may be used as a PF, and within the PF, an index (index) i_s of the PO corresponding to the terminal device may be calculated according to the formula i_s=floor (UE_ID/N) mod Ns. T denotes a cycle length of a paging cycle of the terminal device; UE_ID is used to identify a terminal device; N denotes a quantity of PFs within the paging cycle; Ns denotes a quantity of POs within one PF; and PF_offset denotes a frame offset of the PF.

It should be noted that, for a terminal device, if a default DRX cycle is different from a DRX cycle configured for the terminal device, a cycle length of the shorter DRX cycle of the two DRX cycles may be selected as the above-mentioned T. In other words, T=min (T_UE, T_sib), where T_sib denotes a cycle length of the default DRX cycle indicated in a system message, and T_UE denotes a cycle length of the DRX cycle configured for the terminal device. Certainly, for a terminal device that is not configured with T_UE, the cycle length of the default DRX cycle indicated in the system message may be used as a value of T, that is, T=T_sib.

It should also be noted that, the UE_ID may be calculated through the formula UE_ID=(5G-S-TMSI mod 1024), where 5G-S-TMSI denotes a TMSI allocated by a communications system to a terminal device.

In addition, in the NR technology, for a terminal device in an RRC idle state, a network device does not know which transmit beam should be used to transmit a paging message to the terminal device. To ensure that the terminal device may receive the paging message, the network device transmits the paging message in a beam sweeping manner. To support multi-beam transmission of the paging message, the PO may be defined as a group of PDCCH monitoring occasions (PDCCH monitoring occasions), and different PDCCH monitoring occasions correspond to paging indication information transmitted through different transmitting beams. One PF may include one or more POs or starting points of a PO.

Since each SSB index corresponds to one PDCCH monitoring occasion, and different SSB indexes correspond to different beams, a plurality of PDCCH monitoring occasions in one PO may be associated with transmitting beams corresponding to different SSB indexes to support multi-beam transmission of the paging message. The messages transmitted on each SSB beam are identical. Generally, SSBs required to complete one round of beam sweeping constitute an "SSB burst" (SSB burst). PDCCH monitoring occasions are a series of time locations determined by a paging search space (paging search space).

The PDCCH monitoring occasions are numbered starting from the first PDCCH monitoring occasion of a PF, up to a next PF. S consecutive PDCCH monitoring occasions constitute one PO, where S is a quantity of actual transmitting SSBs. A number of a start PDCCH monitoring occasion of each PO may be determined by a parameter firstPDCCH-MonitoringOccasionOfPO. If this parameter exists, the number of the start PDCCH monitoring occasion of the $(i\_s+1)^{th}$ PO is the $(i\_s+1)^{th}$ value of the parameter. If this parameter does not exist, all PDCCH monitoring occasions sequentially form POs one by one, and the number of the start PDCCH monitoring occasion of the $(i\_s+1)^{th}$ PO is i_s*S.

It should be noted that, PDCCH monitoring occasions constituting one PO may be located in one PF or in two PFs, that is, the PDCCH monitoring occasions included in a same PO may be cross-frame.

Based on the foregoing description, it may be learned that a terminal device periodically monitors a PDCCH in a PO in a manner similar to the DRX mechanism, with a paging cycle as a cycle, to obtain paging indication information. However, for some terminal devices, they may not be paged for a long time, but still need to keep awake periodically to monitor a PDCCH that possibly carries paging indication information. Further optimization can be made for power saving of such terminal devices.

Paging Early Indication (Paging Early Indication, PEI)

For POs configured for a terminal device, paging messages are transmitted in only about 10% of the POs, and there is no information useful to the terminal device in the remaining POs. In other words, paging detection performed by the terminal device in the remaining 90% of the POs is only wasting power. Before paging detection, some communications systems (such as Rel-17 of NR and later versions of NR) support transmission of a PEI. The PEI may be carried in a DCI time sequence. The PEI may be used to indicate whether there is a paging message for the terminal device subsequently. The terminal device may determine, based on the PEI, whether to perform detection of a paging message in a subsequent PO or to continue to sleep. The introduction of the PEI may reduce power consumption of the terminal device.

The PEI provides indication on a subgroup (subgroup refers to a group of terminal devices) basis. The PEI includes indication information (or bits) respectively corresponding to one or more subgroups. The indication information corresponding to a respective subgroup may be used to indicate whether to perform detection of a paging message in a subsequent PO or continue to sleep by terminal devices in the respective subgroup. The terminal devices may find corresponding indication information in the PEI according to respective subgroup sequence numbers of the terminal devices, and then determine, based on the indication information, whether to perform detection of a paging message subsequently.

As shown in FIG. 4, one PEI may include a plurality of bits, and some or all of the bits may be used as indications of the PEI. In these bits used as indications of the PEI, each bit corresponds to a respective subgroup, and is used to indicate whether to perform paging detection by terminal devices in the respective subgroup. Referring to FIG. 4, one PEI includes eight bits, and the eight bits correspond to eight subgroups, respectively. The first bit (that is, a subgroup 1 PEI) may be used to indicate whether to perform paging detection by terminal devices in a subgroup 1, the second bit (that is, a subgroup 2 PEI) may be used to indicate whether to perform paging detection by terminal devices in a subgroup 2, and so on.

The first bit is used as an example. When the bit has a first value, it indicates the terminal devices in the subgroup 1 to perform paging detection. When the bit has a second value, it indicates the terminal devices in the subgroup 1 not to perform paging detection. The first value may be one of 0 and 1, and the second value may be the other of 0 and 1.

Based on the foregoing concepts, the following describes the embodiments of the present application in detail.

Embodiment 1

Currently, the protocol only discusses using a PEI to indicate whether to perform paging detection by a terminal device in a subgroup. However, how to determine a subgroup is not specified.

In view of the foregoing problem, a solution of an embodiment in the present application is described in detail with reference to FIG. 5.

Figure 5:
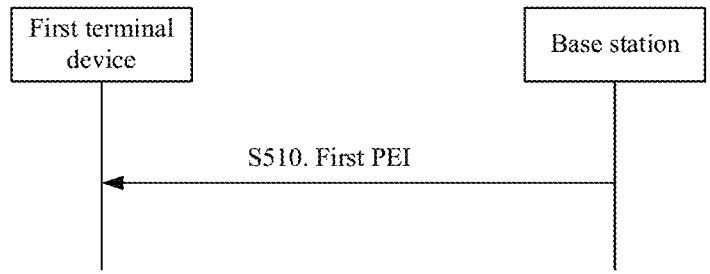
FIG. 5 is a schematic flowchart of a wireless communication method according to an embodiment of the present application.

FIG. 5 is a wireless communication method according to an embodiment of the present application. The method may be performed by a first terminal device and a network-side device (for example, a base station). The first terminal device and the network-side device may be any types of terminal device and base station mentioned above. The first terminal device may be a terminal device in an RRC idle state, or may be a terminal device in an RRC inactive state or an RRC connected state.

Step S510: A base station transmits a first PEI to a first terminal device. The first PEI may be used to indicate whether to perform paging detection by at least one subgroup. The at least one subgroup includes a first subgroup. The first subgroup is a subgroup to which the first terminal device belongs. A sequence number of the first subgroup may be determined based on at least one of: an ID of the first terminal device, an indication from the base station, or an indication from a core network device. In other words, the sequence number of the first subgroup may be determined by the first terminal device, or may be indicated by the base station or the core network device to the first terminal device.

In some embodiments, the first terminal device may determine the sequence number of the first subgroup based on the ID of the first terminal device.

The sequence number of the first subgroup may be determined based on a rank of the first terminal device, among a plurality of terminal devices corresponding to a first PO. Regarding a PO, there may be a case that a plurality of terminal devices share the same PO, that is, paging messages of the plurality of terminal devices are transmitted on a same PO. The first PO in this embodiment of the present application may be a PO shared by the plurality of terminal devices, that is, the first PO may be used to carry paging messages of the plurality of terminal devices. It may be understood that the first PO is also a PO corresponding to the first terminal device, and the first terminal device may calculate an index of the first PO in the manner described above. The first PO may include one or more POs. The first PO corresponds to one indication in the PEI.

In this embodiment of the present application, terminal devices sharing the first PO may be sorted in sequence, and then grouped in subgroups based on a sorted sequence. For example, according to IDs of the terminal devices, the sequence number of the first terminal device in the first PO is as follows:

$$\text{floor}[\text{floor}(\text{UE\_ID}/N_n)/(Ns/m)] \qquad (1)$$

where UE_ID denotes an identity of the first terminal device, $N_n$ denotes a quantity of paging frames in a paging cycle corresponding to paging of an $n^{th}$ group, Ns denotes a quantity of paging occasions in one paging frame, m denotes a quantity of POs indicated in one PEI, m is a positive integer, G denotes a quantity of subgroups in one PO, floor denotes a floor operation, and n is 1 or 2.

It may be understood that the paging cycle corresponding to paging of the $n^{th}$ group may be a paging cycle corresponding to a type of a paging message that is to be received by the $n^{th}$ subgroup. For example, if the paging message that is to be received by the $n^{th}$ subgroup is RAN-initiated paging, the paging cycle may be a paging cycle corresponding to the RAN-initiated paging, namely, a paging cycle of the RAN. For another example, if the paging message that is to be received by the $n^{th}$ subgroup is CN-initiated paging, the paging cycle may be a paging cycle corresponding to the CN-initiated paging, namely, a paging cycle of the CN.

There may be one or more POs indicated in one PEI. If different quantities of POs are indicated in different PEI, m is set to different values, where m may be 1, or may be another value such as 2, 3, or 4. When m is 1, it indicates that one PEI indicates one PO. When m is 2, it indicates that one PEI indicates two PO, and so on. In this solution, through the floor operation, a terminal device may be numbered in the first PO, so that a subgroup sequence number is subsequently allocated based on the number.

After the sequence number of the first terminal device in the first PO is obtained, a subgroup sequence number of the first terminal device may be determined by using the following formula (2):

$$\text{floor}[\text{floor}(UE\_ID/N_n)/(Ns/m)] \bmod \left(\sum\nolimits_{p=1}^{m} G_{np}\right) \quad (2)$$

where mod denotes a modulo operation, $G_{np}$ denotes a quantity of subgroups, having a same type as the $n^{th}$ subgroup, in a $p^{th}$ PO of POs indicated in one PEI (for example, the first PEI), n is 1 or 2, and 1≤p≤m.

One PEI may indicate a plurality of POs, and the plurality of POs may include a same quantity or different quantities of subgroups. $\Sigma_{p=1}^{m} G_{np}$ denotes a total quantity of subgroups, having a same type as the $n^{th}$ subgroup, included in a plurality of POs indicated by one PEI (for example, the first PEI).

It is assumed that the first terminal device belongs to the first subgroup and a second subgroup, and the first subgroup and the second subgroup belong to different categories. For example, the first subgroup is configured to receive a paging message initiated by a RAN, and the second subgroup is configured to receive a paging message initiated by a CN. When n is 1, $G_{np}$ denotes a quantity of subgroups, having a same type as the first subgroup, in the $p^{th}$ PO. When n is 2, $G_{np}$ denotes a quantity of subgroups, having a same type as the second subgroup, in the $p^{th}$ PO.

If the plurality of POs each include a same quantity of subgroups, the formula (2) may be changed as follows:

$$\text{floor}[\text{floor}(UE\_ID/N_n)/(Ns/m)] \bmod(m*G_n) \quad (3)$$

where $G_n$ denotes a quantity of subgroups, having a same type as the $n^{th}$ subgroup, in one PO.

The foregoing manner of determining a sequence number of a subgroup is applicable to a terminal device in an RRC_IDLE state, an RRC_INACTIVE state, or an RRC_CONNECTED state.

For the CN-initiated paging or the RAN-initiated paging, a paging cycle may be broadcast by using a system message. For the CN-initiated paging, a specific cycle may further be configured for a terminal device by using NAS signalling. For the RAN-initiated paging, a specific cycle may further be configured for a terminal device by using a RAN. The terminal device may use the shortest cycle in foregoing cycles. In other words, for a terminal device in an RRC idle state, a shorter cycle in the two cycles may be used. For a terminal device in an RRC inactive state, the shortest cycle in the three periods may be used. It may be understood that different paging cycles correspond to different quantities of paging frames, and thus different sequence numbers of subgroups are obtained.

In some other embodiments, the subgroup sequence number of the first terminal device may alternatively be indicated by a base station and/or a core network device. For example, the base station may instruct the subgroup sequence number of the first terminal device to the first terminal device by using RRC signalling. In this case, the first terminal device may be a terminal device in an RRC_INACTIVE state or an RRC_CONNECTED state. The subgroup sequence number of the first terminal device is a subgroup sequence number of the first terminal device in the first PEI, and a paging message corresponding to the first PEI is a CN-initiated paging message or a RAN-initiated paging message.

For another example, the core network device may instruct a subgroup sequence number of the first terminal device to the first terminal device by using non-access stratum (non-access stratum, NAS) signalling. In this case, the first terminal device may be a terminal device in an RRC_IDLE state or an RRC_INACTIVE state. The subgroup sequence number of the first terminal device is a subgroup sequence number of the first terminal device in the first PEI, and a paging message corresponding to the first PEI is a CN-initiated paging message.

The sequence number of the subgroup of the first terminal device is instructed by the base station or core network device, so that control flexibility on a network side may be increased, and a probability that the terminal device is falsely woken up is reduced. False wakeup refers to a case in which no paging message is actually transmitted to a terminal device, but a PEI indicates that terminal devices in a subgroup to which the terminal device belongs is paged, and the terminal device wakes up to perform paging detection but does not detect a paging message. False wakeup brings unnecessary power consumption to the terminal device. Paging detection herein refers to detection of a paging message.

In some embodiments, a terminal device may be grouped in the first subgroup based on a service type of the terminal device. In other words, the base station or the core network device may classify terminal devices of a same service type into one subgroup. The service type of the terminal device may include one or more of eMBB, uRLLC, or mMTC.

Different service scenarios have different paging requirements and delay requirements. For example, in a uRLLC scenario, the terminal device is sensitive to a delay, and a paging cycle is relatively short. The base station or the core network device may classify terminal devices according to different service types. For example, terminal devices with a long paging cycle are classified into one subgroup, and terminal devices with a short paging cycle are classified into another subgroup. This may avoid that a terminal device with a long paging cycle and a terminal device with a short paging cycle are classified into a same subgroup, thus preventing the terminal device with a long paging cycle from being falsely woken up.

In some other embodiments, a terminal device may be grouped in the first subgroup based on an oftenness of paging the terminal device (also referred to as a scheduling status). For example, the base station or the core network device may classify terminal devices with frequent paging into one subgroup, and classify terminal devices with less frequent paging into another subgroup, that is, allocate a same subgroup sequence number to the terminal devices with frequent paging, and allocate a same subgroup sequence number to the terminal devices with less frequent paging. In this way, a probability that a terminal device with less frequent paging is falsely woken up may be reduced.

For example, a probability that a terminal device A is paged is 0.1, and a probability that a terminal device B is paged is 0.01. In this case, the base station or the core network device may classify terminal devices with a relatively low delay requirement and a paging probability of about 0.01 into one subgroup, and transmit a paging message to all of these terminal devices every dozens of paging cycles. This may prevent the terminal devices with a paging probability of about 0.01 from being falsely woken up.

In some embodiments, a grouping manner of at least one of the first subgroup or the second subgroup may be predefined by a protocol or indicated by using higher layer signalling. The first subgroup is used as an example. Whether the first subgroup is determined based on an ID of the terminal device, a service type of the terminal device, or an oftenness of paging the terminal device, may be predefined by a protocol, or indicated by using higher-layer signalling.

Embodiment 2

It may be learned from Embodiment 1 that a terminal device may use a plurality of manners to determine a subgroup to which the terminal device belongs, and thus a plurality of subgroup sequence numbers may be determined by the terminal device. In this case, the terminal device may be confused about the subgroup. For example, the terminal device does not know which subgroup sequence number from a PEI is used for subsequent processing.

For example, the terminal device may determine a subgroup sequence number based on UE_ID (for example, Formula (2) or Formula (3)), or may learn a subgroup sequence number by using RRC signalling or NAS signalling. For CN-initiated paging, the terminal device determines a subgroup sequence number based on Formula (2), and for RAN-initiated paging, the terminal device determines a subgroup sequence number in the PEI based on RRC signalling. When the terminal device belongs to different subgroups for the CN-initiated paging and the RAN-initiated paging, after a PEI is detected, the terminal device does not know which subgroup sequence number is to be used for subsequent processing.

Alternatively, for the CN-initiated paging, the terminal device may determine a subgroup sequence number based on Formula (2), and may further determine a subgroup sequence number based on RRC signalling. In this case, when the terminal device detects the PEI, the terminal device does not know which subgroup sequence number is to be used for subsequent processing.

For another example, if both a PO location for the RAN-initiated paging and a PO location for the CN-initiated paging are determined based on an ID of the terminal device, the two PO locations may overlap. If different subgroup sequence numbers are determined by the terminal device for the CN-initiated paging and the RAN-initiated paging, when the PEI is detected, the terminal device does not know which subgroup sequence number is to be used for subsequent processing.

In view of the foregoing problem, a solution of an embodiment in the present application is described in detail with reference to FIG. 6.

Figure 6:
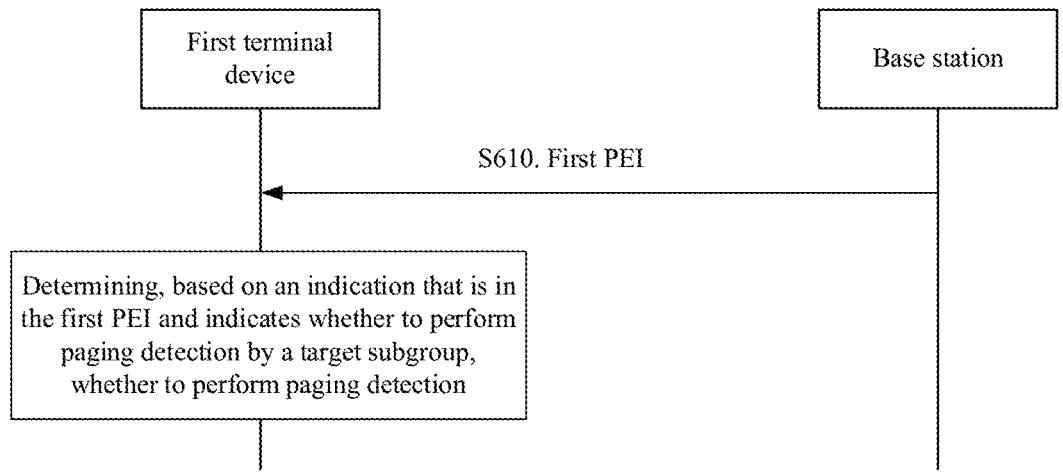
FIG. 6 is a schematic flowchart of a wireless communication method according to another embodiment of the present application.

FIG. 6 is a schematic flowchart of a wireless communication method according to an embodiment of the present application. The method illustrated in FIG. 6 may be performed by a first terminal device and a network-side device (for example, a base station). The first terminal device and the network-side device may be any types of terminal device and base station mentioned above. The first terminal device may be a terminal device in an RRC idle state, or may be a terminal device in an RRC inactive state or an RRC connected state. The first terminal device may belong to both a first subgroup and a second subgroup. The first subgroup and the second subgroup belong to different categories, that is, the first subgroup belongs to a first category, and the second subgroup belongs to a second category. A manner of determining a subgroup category is not specifically limited in embodiments of the present application. For example, subgroups may be classified based on a service type (such as cMBB, uRLLC, or mMTC). For another example, subgroups may be classified based on a paging message type. The paging message type may include CN-initiated paging and RAN-initiated paging. As an example, the first subgroup may correspond to a RAN-initiated paging message, that is, the first subgroup is configured to receive the RAN-initiated paging message. The second subgroup may correspond to a CN-initiated paging message, that is, the second subgroup is configured to receive the CN-initiated paging message.

Step S610: A base station transmits a first PEI to a first terminal device. The first PEI may be used to indicate whether to perform paging detection by the first subgroup and the second subgroup. The first PEI may include two pieces of indication information, such as indication information 1 and indication information 2. The indication information 1 may be used to indicate whether to perform paging detection by the first subgroup, and the indication information 2 may be used to indicate whether to perform paging detection by the second subgroup.

Step S620: The first terminal device determines, based on an indication that is in the first PEI and indicates whether to perform paging detection by a target subgroup, whether to perform paging detection. The target subgroup is the first subgroup and/or the second subgroup.

The target subgroup may be predefined by a protocol, or may be indicated by using higher layer signalling. The protocol or higher layer signalling may instruct a terminal device to perform subsequent processing according to an indication of the target subgroup in the PEI.

For example, for a terminal device in an RRC_INACTIVE state, the terminal device may receive a subgroup sequence number indicated by a network side, and may further obtain a subgroup sequence number through calculation according to a UE ID. In this case, the protocol may specify that the terminal device performs paging detection only according to the subgroup sequence number obtained through calculation according to the UE ID (that is, the target subgroup is a subgroup determined according to the UE ID). In this way, a behavior of the terminal device may be specified, and the network-side device and the terminal device have consistent understanding of a subgroup.

In some embodiments, the target subgroup is the first subgroup. The first terminal device may determine, based on an indication that is in the first PEI and indicates whether to perform paging detection by the first subgroup, whether to perform paging detection. If the first PEI indicates performing paging detection by the first subgroup, the first terminal device performs paging detection. If the first PEI indicates not performing paging detection by the first subgroup, the first terminal device does not perform paging detection. In this case, the first terminal device may detect only the first subgroup in the first PEI, but not detect the second subgroup in the first PEI. In other words, if the first PEI indicates not performing paging detection by the first subgroup, the first terminal device will not perform paging detection even if the first PEI indicates performing paging detection by the second subgroup. If the first PEI indicates performing paging detection by the first subgroup, the first terminal device will still perform paging detection even if the first PEI indicates not performing paging detection by the second subgroup.

In some embodiments, the target subgroup is the second subgroup. The first terminal device may determine, based on an indication that is in the first PEI and indicates whether to perform paging detection by the second subgroup, whether to perform paging detection. If the first PEI indicates performing paging detection by the second subgroup, the first terminal device performs paging detection. If the first PEI indicates not performing paging detection by the second subgroup, the first terminal device does not perform paging detection. In this case, the first terminal device may detect only the second subgroup in the first PEI, but not detect the first subgroup in the first PEI. In other words, if the first PEI indicates not performing paging detection by the second subgroup, the first terminal device will not perform paging detection even if the first PEI indicates performing paging detection by the first subgroup. If the first PEI indicates performing paging detection by the second subgroup, the first terminal device will still perform paging detection even if the first PEI indicates not performing paging detection by the first subgroup.

In some embodiments, the target subgroup is the first subgroup and the second subgroup. The first terminal device may determine, based on indications that are in the first PEI and respectively indicate whether to perform paging detection by the first subgroup and the second subgroup, whether to perform paging detection. For example, the first terminal device may perform paging detection in a case that paging detection is to be performed by any one of the first subgroup and the second subgroup. In other words, if the first PEI indicates performing paging detection by the first subgroup and/or the second subgroup, the first terminal device performs paging detection. Only when the first PEI indicates performing paging detection by neither the first subgroup nor the second subgroup, the first terminal device does not perform paging detection. In this manner, complexity of scheduling by the base station or the core network device may be reduced, because the base station or the core network device does not need to additionally indicate the target subgroup to the terminal device.

There may be one or more POs indicated in the first PEI. In some embodiments, the first subgroup and the second subgroup correspond to different POs. When the first PEI indicates a plurality of POs, and the first subgroup and the second subgroup belong to different POs, if the first PEI indicates performing paging detection by the first subgroup and/or the second subgroup, the first terminal device performs paging detection, which may mean that if paging detection is determined to be performed by the first subgroup and/or the second subgroup, the first terminal device performs paging detection in respective POs to which the first subgroup and the second subgroup belong. Assuming that the first subgroup belongs to a first PO and the second subgroup belongs to a second PO, if paging detection is to be performed by the first subgroup and/or the second subgroup, the first terminal device performs paging detection in both the first PO and the second PO. In this manner, a probability that another terminal device in a same subgroup with the first terminal device is falsely woken up may be reduced. For example, another terminal device in a PO corresponding to the first subgroup needs to wake up to perform paging detection. In a PO corresponding to the second subgroup, there is a paging message for the terminal device. The first PEI indicates that the first subgroup needs to perform paging detection, and the second subgroup does not need to perform paging detection. The first terminal device performs paging detection in the respective POs corresponding to the first subgroup and the second subgroup, and the paging message is detected. Another terminal device in the second subgroup does not perform paging detection according to the PEI, and thus is not falsely woken up, thereby reducing power consumption.

Embodiment 3

It may be learned from the foregoing description that a PEI may indicate whether to perform paging detection by a subgroup. When a terminal device in the subgroup has a paging message, the PEI indicates that paging detection is to be performed by the subgroup. If only one or a small part of the terminal devices in the subgroup have paging messages, all of the terminal devices in the subgroup are woken up to perform paging detection, which increases a probability that another terminal device is falsely woken up.

In view of the foregoing problem, a solution of the embodiment in the present application is described in detail with reference to FIG. 7.

Figure 7:
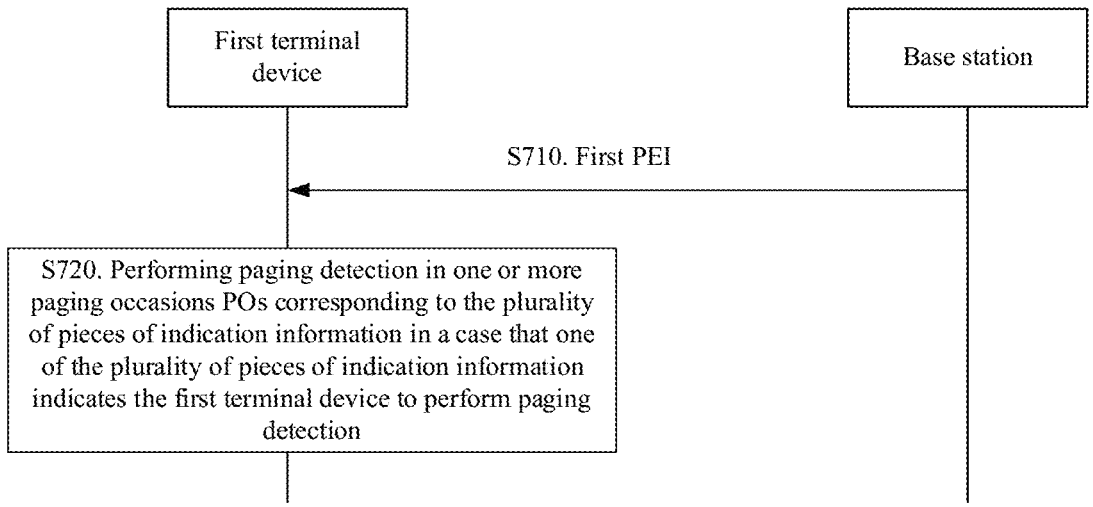
FIG. 7 is a schematic flowchart of a wireless communication method according to still another embodiment of the present application.

FIG. 7 is a schematic flowchart of a wireless communication method according to an embodiment of the present application. The method illustrated in FIG. 7 may be performed by a first terminal device and a network-side device (for example, a base station). The first terminal device and the network-side device may be any types of terminal device and base station mentioned above. The first terminal device may be a terminal device in an RRC idle state, or may be a terminal device in an RRC inactive state or an RRC connected state. The first terminal device may belong to a plurality of subgroups. The plurality of subgroups may be subgroups determined according to the embodiments. For example, the plurality of subgroups may be subgroups determined by using one or more of Formula (2), RRC signalling, or NAS signalling. The plurality of subgroup may include a subgroup configured to receive a RAN-initiated paging message, and also include a subgroup configured to receive a CN-initiated paging message.

Step S710: A base station transmits a first PEI to a first terminal device. The first PEI may include a plurality of pieces of indication information, and the plurality of pieces of indication information are respectively used to indicate whether to perform paging detection by a plurality of subgroups. In other words, each subgroup corresponds to respective indication information, and each piece of indication information may be used to indicate whether to perform paging detection by a subgroup corresponding to the indication information.

Step S720: In a case that one of the plurality of pieces of indication information indicates performing paging detection by the first terminal device, the first terminal device performs paging detection in one or more POs corresponding to the plurality of pieces of indication information.

Because the first terminal device belongs to a plurality of subgroups, that the plurality of pieces of indication information indicate whether to perform paging detection by the plurality of subgroups may also be understood as follows: the plurality of pieces of indication information indicate whether to perform paging detection by the first terminal device.

In this embodiment of the present application, one piece of indication information in the plurality of pieces of indication information may be any piece of indication information. In a case that any piece of indication information indicates performing paging detection by the first terminal device, the first terminal device performs paging detection in one or more POs corresponding to the plurality of pieces of indication information. It is assumed that the plurality of pieces of indication information include first indication information. When the first indication information indicates performing paging detection by the first terminal device, the first terminal device performs paging detection in POs corresponding to the plurality of pieces of indication information regardless of whether another piece of indication information indicates performing paging detection by the first terminal device or not.

The plurality of pieces of indication information may correspond to a same PO or different POs. This is not specifically limited in embodiments of the present application. In some embodiments, the plurality of pieces of indication information correspond to different POs. It is assumed that the plurality of pieces of indication information include first indication information. The first indication information may be used to indicate whether to perform paging detection by a first subgroup, and a PO corresponding to the first indication information is a first PO. When the first indication information indicates that paging detection is to be performed, the first subgroup performs paging detection in the first PO. In a case that the plurality of pieces of indication information further include second indication information, the second indication information is used to indicate whether to perform paging detection by a second subgroup, and a PO corresponding to the second indication information is a second PO. The first terminal device may belong to the first subgroup and the second subgroup. In a case that the first indication information indicates performing paging detection by the first subgroup, and the second indication information indicates not performing paging detection by the second subgroup, the first terminal device performs paging detection in both the first PO and the second PO.

According to the foregoing manner, when an actual paging message for the first terminal device is transmitted in a PO corresponding to the second indication information (namely, the second PO) but no paging message is transmitted for any other terminal devices than the first terminal device in a subgroup corresponding to the second indication information (namely, the second subgroup), since a paging message is transmitted for a terminal in a subgroup corresponding to the first indication information (namely, the first subgroup), the base station or the network device may indicate in the first indication information that there is a paging message and indicate in the second indication information that there is no paging message. After receiving the first PEI, the first terminal device may perform paging detection in both the first PO and the second PO, while other terminal devices in the second subgroup do not need to wake up for paging detection, so that a probability that another terminal device is falsely woken up may be reduced.

In addition, since a paging data channel has a relatively high modulation order, a higher synchronization accuracy is required. The higher the synchronization accuracy, the higher the energy consumption. To perform paging detection, the terminal device is required to perform high-precision synchronization before receiving the paging channel. Energy consumed for synchronization occupies a relatively high proportion of energy consumed in performing paging detection. After completing synchronization, the terminal device starts to receive a paging signal. Because a plurality of POs indicated in one PEI are relatively close to each other in terms of time, the terminal device keeps awake and does not enter a sleep state. Compared to a process of being out-of-synchronization, performing synchronization, and performing paging detection, this process has relatively low power consumption. Therefore, keeping awake and performing paging detection in a plurality of POs by the terminal device will not consume too much power of the terminal device.

Embodiment 4

For paging, a PO in a paging cycle is required to carry paging messages for all of terminal devices in a tracking area. One tracking area includes areas covered by a plurality of base stations. Each PO actually can carry only paging messages for 32 terminal devices, but a quantity of terminal devices allowed to be paged by paging messages in the PO is far greater than 32. In this embodiment of the present application, a terminal device that is allowed to be paged by a paging message in the PO is referred to as a candidate terminal device. The PEI provides indication with respect to candidate terminal devices, instead of terminal devices that are actually paged by paging messages. A quantity of candidate terminal devices is far greater than a quantity of terminal devices that are actually paged by paging messages. In the PEI, one bit is used for indicating whether terminal devices in a subgroup have a paging message. As long as one terminal device in the group of terminal devices is paged, a corresponding bit in the PEI indicates performing paging detection by the subgroup, and all terminal devices in the subgroup are required to wake up to perform paging detection. In other words, a larger quantity of terminal devices in a subgroup indicates a higher probability that the terminal devices are falsely woken up. False wakeup refers to a case in which a terminal device actually does not have a paging message, but the terminal device wakes up to perform paging detection because a PEI indicates that another terminal device in a subgroup to which the terminal device belongs is paged.

For example, it is assumed that terminal devices are independent of each other, and a paging probability of each terminal device is 0.1. If there are 10 terminal devices in a subgroup, a probability that the terminal devices in the subgroup are not required to wake up is $0.9^{10}=0.35$. If there are 20 terminal devices in a subgroup, a probability that the terminal devices in the subgroup are not required to wake up is $0.9^{20}=0.12$. If there are 30 terminal devices in a subgroup, a probability that the terminal devices in the subgroup are not required to wake up is $0.9^{30}=0.04$. It can be learned from the foregoing description that when a quantity of terminals in a subgroup is relatively large, a probability that the terminal devices in the subgroup are not required to perform paging detection is very small, and a probability of being required to perform paging detection is very large. Taking 30 terminal devices in a subgroup as an example, 4% of paging detections are not required to be performed by the terminal devices, and 96% of paging detections are required to be performed by the terminal devices. Each terminal device is required to perform PEI detection before each paging detection, and power consumption for the PEI detection is greater than power consumption for the 4% of paging detections performed by the terminal devices. Thus, in this embodiment of the present application, a probability that the terminal device is falsely woken up is reduced by reducing a quantity of terminal devices that share a same subgroup.

Figure 8:
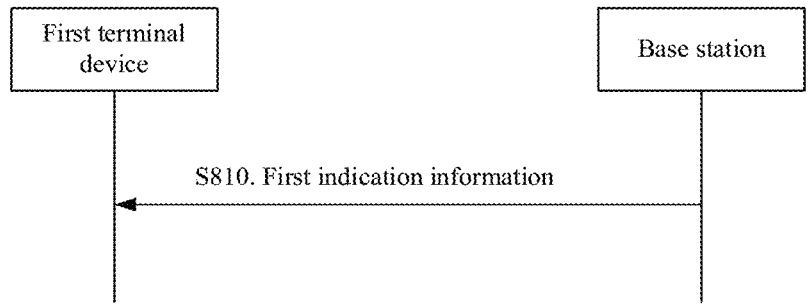
FIG. 8 is a schematic flowchart of a wireless communication method according to still another embodiment of the present application.

The following describes solutions in embodiments of the present application in detail with reference to FIG. 8.

FIG. 8 is a schematic flowchart of a wireless communication method according to an embodiment of the present application. The method illustrated in FIG. 8 may be performed by a first terminal device and a network-side device (for example, a base station). The first terminal device and the network-side device may be any types of terminal device and base station mentioned above. The first terminal device may be a terminal device in an RRC idle state, or may be a terminal device in an RRC inactive state or an RRC connected state.

Step S810: A base station transmits first indication information to a first terminal device, where the first indication information is used to instruct to enable or disable a PEI.

In a case that the first indication information instructs to enable the PEI, the first terminal device detects the PEI. The first terminal device may determine, based on an indication in the PEI, whether to perform paging detection. If the PEI indicates performing paging detection by the first terminal device, the first terminal device performs paging detection. If the PEI indicates the first terminal device not to perform paging detection, the first terminal device does not perform paging detection.

If the first indication information instructs to disable the PEI, the first terminal device may not detect the PEI. The first terminal device may directly perform paging detection in a determined PO. If the first terminal device disables the PEI, which is equivalent to reducing a quantity of terminal devices in a subgroup indicated in the PEI, a probability that another terminal device is falsely woken up may be reduced.

In some embodiments, when a quantity of terminal devices in a subgroup exceeds a specific threshold, the base station or the core network device may disable PEIs for part of terminal devices in the subgroup, to reduce a probability that another terminal device is falsely woken up.

The first terminal device in this embodiment of the present application may be a terminal device with a relatively high paging probability or a terminal device with a relatively high delay requirement.

In some embodiments, the first indication information may be carried in one or more of: a system message, MAC layer signalling, RRC signalling, DCI, or NAS signalling.

The plurality of embodiments described above may be implemented separately or combined with each other, which is not specifically limited in embodiments of the present application. For example, a manner of determining a subgroup in Embodiment 1 may be combined with another embodiment, that is, the manner in Embodiment 1 may be used in another embodiment for determining a subgroup sequence number. For another example, a manner of enabling or disabling a PEI in Embodiment 4 may be combined with another embodiment. For example, in Embodiment 2, the first PEI is received by the first terminal device only when the first indication information instructs to enable the PEI.

The method embodiments of the present application are described in detail above with reference to FIG. 1 to FIG. 8. Apparatus embodiments of the present application are described in detail below with reference to FIG. 9 and FIG. 17. It should be understood that the description of the method embodiments corresponds to the description of the apparatus embodiments, and therefore, for a part that is not described in detail, reference may be made to the foregoing method embodiments.

Figure 9:
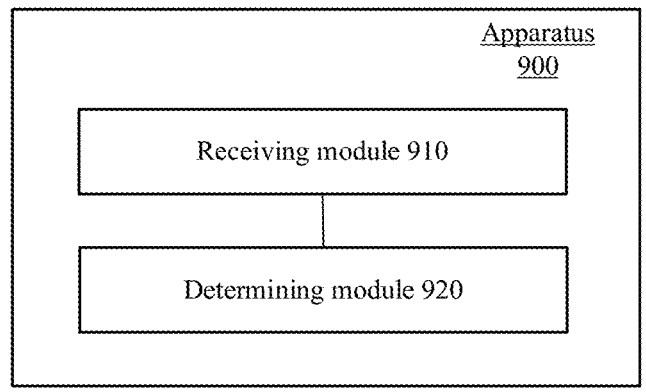
FIG. 9 is a schematic structural diagram of a wireless communications apparatus according to an embodiment of the present application.

FIG. 9 is a schematic structural diagram of a wireless communications apparatus according to an embodiment of the present application. The apparatus 900 in FIG. 9 is a first terminal device. The wireless communications apparatus 900 may include a receiving module 910 and a determining module 920.

The receiving module 910 is configured to receive a first PEI, where the first terminal device belongs to a first subgroup and a second subgroup, and the first PEI is used to indicate whether to perform paging detection by the first subgroup and the second subgroup.

The determining module 920 is configured to determine, by the first terminal device based on an indication that is in the first PEI and indicates whether to perform paging detection by a target subgroup, whether to perform paging detection, where the target subgroup is the first subgroup and/or the second subgroup.

In some embodiments, the first subgroup is a first-type subgroup, and the second subgroup is a second-type subgroup.

In some embodiments, the first subgroup corresponds to a radio access network RAN-initiated paging message, and the second subgroup corresponds to a core network CN-initiated paging message.

In some embodiments, the target subgroup is predefined by protocol or indicated by using higher layer signalling.

In some embodiments, the target subgroup is the first subgroup and the second subgroup, and the determining module 920 is configured to: perform paging detection in a case that the first PEI indicates performing paging detection by any one of the first subgroup and the second subgroup; skip paging detection in a case that the first PEI indicates performing paging detection by neither the first subgroup nor the second subgroup.

In some embodiments, the first subgroup and the second subgroup correspond to different paging occasions POs.

In some embodiments, the first subgroup corresponds to a first PO, the second subgroup corresponds to a second PO, and the determining module 920 is configured to: perform paging detection in each of the first PO and the second PO in a case that the first PEI indicates performing paging detection by any one of the first subgroup and the second subgroup.

In some embodiments, the target subgroup is the first subgroup, and the determining module 920 is configured to: perform paging detection in a case that the first PEI indicates performing paging detection by the first subgroup; skip paging detection in a case that the first PEI indicates not performing paging detection by the first subgroup.

In some embodiments, the target subgroup is the second subgroup, and the determining module 920 is configured to: perform paging detection in a case that the first PEI indicates performing paging detection by the second subgroup; and skip paging detection in a case that the first PEI indicates not performing paging detection by the second subgroup.

In some embodiments, a sequence number of the first subgroup is determined based on RRC signalling.

In some embodiments, a sequence number of the second subgroup is determined based on NAS signalling.

In some embodiments, a terminal device is grouped in the first subgroup and/or the second subgroup based on a service type of the terminal device and/or an oftenness of paging the terminal device.

In some embodiments, the service type includes one or more of the following: eMBB, uRLLC, or mMTC.

In some embodiments, a sequence number of an $n^{th}$ subgroup is determined as follows:

$$\text{floor}[\text{floor}(UE\_ID/N_n)/(Ns/m)] \bmod \left(\sum_{p=1}^{m} G_{np}\right),$$

where UE_ID denotes an identity of the first terminal device, $N_n$ denotes a quantity of paging frames in a paging cycle corresponding to paging of the $n^{th}$ group, Ns denotes a quantity of POs in one paging frame, m denotes a quantity of POs indicated in one PEI, m is a positive integer, $G_{np}$ denotes a quantity of subgroups, having a same type as the $n^{th}$ subgroup, in a $p^{th}$ PO of POs indicated in the first PEI, 1≤p≤m, n is 1 or 2, floor denotes a floor operation, and mod denotes a modulo operation.

In some embodiments, a sequence number of an $n^{th}$ subgroup is determined as follows:

$$\text{floor}[\text{floor}(UE\_ID/N_n)/(Ns/m)]\bmod(m*G_n),$$

where UE_ID denotes an identity of the first terminal device, $N_n$ denotes a quantity of paging frames in a paging cycle corresponding to paging of the $n^{th}$ group, Ns denotes a quantity of POs in one paging frame, m denotes a quantity of POs indicated in one PEI, m is a positive integer, $G_n$ denotes a quantity of subgroups, having a same type as the $n^{th}$ subgroup, in one PO, n is 1 or 2, floor denotes a floor operation, and mod denotes a modulo operation.

In some embodiments, the receiving module 910 is configured to: receive first indication information, where the first indication information is used to instruct the first terminal device to enable or disable a PEI; and receive the first PEI in a case that the first indication information instructs the first terminal device to enable a PEI.

In some embodiments, the receiving module 910 is further configured to: skip receiving of the first PEI in a case that the first indication information instructs the first terminal device to disable the PEI.

In some embodiments, the first indication information is carried in one or more of: a system message, MAC layer signalling, RRC signalling, DCI, or NAS signalling.

In some embodiments, the first terminal device is a terminal device in an RRC inactive state.

Figure 10:
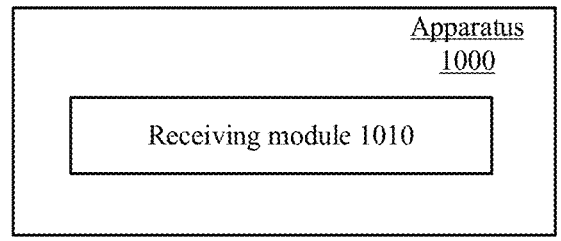
FIG. 10 is a schematic structural diagram of a wireless communications apparatus according to another embodiment of the present application.

FIG. 10 is a schematic structural diagram of a wireless communications apparatus according to another embodiment of the present application. The wireless communications apparatus 1000 in FIG. 10 may be a first terminal device. The wireless communications apparatus 1000 includes a receiving module 1010.

The receiving module 1010 is configured to receive a first PEI, where the first PEI is used to indicate whether to perform paging detection by at least one subgroup, and the at least one subgroup includes a first subgroup. A sequence number of the first subgroup is determined based on at least one of: an ID of the first terminal device, an indication from a base station, or an indication from a core network device.

In some embodiments, the sequence number of the first subgroup is determined as follows:

$$\text{floor}[\text{floor}(UE\_ID/N)/(Ns/m)] \bmod \left(\sum_{p=1}^{m} G_p\right),$$

where UE_ID denotes an identity of the first terminal device, N denotes a quantity of paging frames in a paging cycle, Ns denotes a quantity of paging occasions in one paging frame, m denotes a quantity of POs indicated in one PEI, m is a positive integer, $G_p$ denotes a quantity of subgroups, having a same type as the first subgroup, in a $p^{th}$ PO of POs indicated in the first PEI, 1≤p≤m, floor denotes a floor operation, and mod denotes a modulo operation.

In some embodiments, the sequence number of the first subgroup is determined as follows:

$$\text{floor}[\text{floor}(UE\_ID/N)/(Ns/m)]\bmod(m*G),$$

where UE_ID denotes an identity of the first terminal device, N denotes a quantity of paging frames in a paging cycle, Ns denotes a quantity of paging occasions in one paging frame, m denotes a quantity of POs indicated in one PEI, m is a positive integer, G denotes a quantity of subgroups, having a same type as the first subgroup, in one PO, floor denotes a floor operation, and mod denotes a modulo operation.

In some embodiments, the sequence number of the first subgroup is determined based on RRC signalling or NAS signalling.

In some embodiments, a terminal device is grouped in the first subgroup based on a service type of the terminal device and/or an oftenness of paging the terminal device.

In some embodiments, the service type includes one or more of the following: eMBB, uRLLC, or mMTC.

Figure 11:
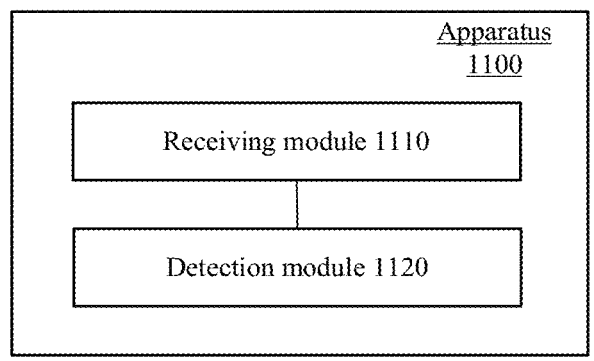
FIG. 11 is a schematic structural diagram of a wireless communications apparatus according to still another embodiment of the present application.

FIG. 11 is a schematic structural diagram of a wireless communications apparatus according to another embodiment of the present application. The wireless communications apparatus 1100 in FIG. 11 may be a first terminal device. The wireless communications apparatus 1100 includes a receiving module 1110 and a detection module 1120.

The receiving module 1110 is configured to receive a first PEI, where the first PEI includes a plurality of pieces of indication information. The plurality of pieces of indication information are respectively used to indicate whether to perform paging detection by a plurality of subgroups, and the first terminal device belongs to the plurality of subgroups.

The detection module 1120 is configured to perform paging detection in one or more POs corresponding to the plurality of pieces of indication information in a case that one of the plurality of pieces of indication information indicates performing paging detection by the first terminal device.

In some embodiments, the plurality of POs includes a PO corresponding to a RAN-initiated paging message and a PO corresponding to a core network CN-initiated paging message.

In some embodiments, the first terminal device is a terminal device in an RRC active state.

Figure 12:
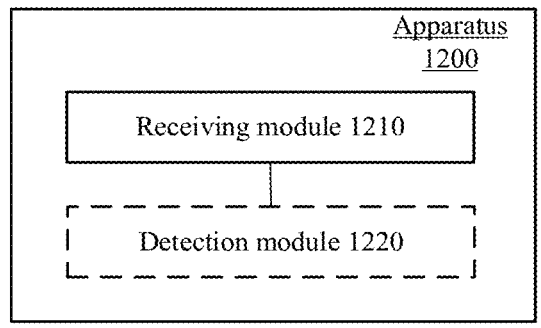
FIG. 12 is a schematic structural diagram of a wireless communications apparatus according to still another embodiment of the present application.

FIG. 12 is a schematic structural diagram of a wireless communications apparatus according to another embodiment of the present application. The wireless communications apparatus 1200 in FIG. 12 may be a first terminal device. The wireless communications apparatus 1200 includes a receiving module 1210.

The receiving module 1210 is configured to receive first indication information, where the first indication information is used to instruct to enable or disable a PEI.

In some embodiments, the apparatus 1200 further includes a detection module 1220, configured to: detect the PEI in a case that the first indication information instructs to enable the PEI; skip detection of the PEI in a case that the first indication information instructs to disable the PEI.

Figure 13:
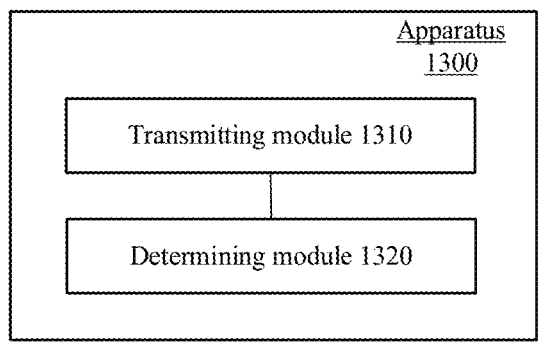
FIG. 13 is a schematic structural diagram of a wireless communications apparatus according to still another embodiment of the present application.

FIG. 13 is a schematic structural diagram of a wireless communications apparatus according to another embodiment of the present application. A wireless communications apparatus 1300 in FIG. 13 may be a base station. The wireless communications apparatus 1300 includes a transmitting module 1310 and a determining module 1320.

The transmitting module 1310 is configured to transmit a first PEI, where the first terminal device belongs to a first subgroup and a second subgroup, and the first PEI is used to indicate whether to perform paging detection by the first subgroup and the second subgroup.

The determining module 1320 is configured to determine, based on an indication that is in the first PEI and indicates whether to perform paging detection by a target subgroup, whether to perform paging detection by the first terminal device, where the target subgroup is the first subgroup and/or the second subgroup.

In some embodiments, the first subgroup is a first-type subgroup, and the second subgroup is a second-type subgroup.

In some embodiments, the first subgroup corresponds to a radio access network RAN-initiated paging message, and the second subgroup corresponds to a core network CN-initiated paging message.

In some embodiments, the target subgroup is predefined by protocol or indicated by using higher layer signalling.

In some embodiments, the target subgroup is the first subgroup and the second subgroup, and the determining module 1320 is configured to: in a case that the first PEI indicates performing paging detection by any one of the first subgroup and the second subgroup, determine to perform paging detection by the first terminal device; in a case that the first PEI indicates performing paging detection by neither the first subgroup nor the second subgroup, determine not to perform paging detection by the first terminal device.

In some embodiments, the first subgroup and the second subgroup correspond to different paging occasions POs.

In some embodiments, the first subgroup corresponds to a first PO, the second subgroup corresponds to a second PO, and the determining module 1320 is configured to: in a case that the first PEI indicates performing paging detection by any one of the first subgroup and the second subgroup, determine to perform paging detection by the first terminal device in each of the first PO and the second PO.

In some embodiments, the target subgroup is predefined by protocol or indicated by using higher layer signalling.

In some embodiments, the target subgroup is the first subgroup, and the determining module 1320 is configured to: in a case that the first PEI indicates performing paging detection by the first subgroup, determine to perform paging detection by the first terminal device; in a case that the first PEI indicates not performing paging detection by the first subgroup, determine not to perform paging detection by the first terminal device.

In some embodiments, the target subgroup is the second subgroup, and the determining module 1320 is configured to: in a case that the first PEI indicates performing paging detection by the second subgroup, determine to perform paging detection by the first terminal device; in a case that the first PEI indicates not performing paging detection by the second subgroup, determine not to perform paging detection by the first terminal device.

In some embodiments, a sequence number of the first subgroup is determined based on RRC signalling.

In some embodiments, a sequence number of the second subgroup is determined based on NAS signalling.

In some embodiments, a terminal device is grouped in the first subgroup and/or the second subgroup based on a service type of the terminal device and/or an oftenness of paging the terminal device.

In some embodiments, the service type includes one or more of the following: eMBB, uRLLC, or mMTC.

In some embodiments, a sequence number of an $n^{th}$ subgroup is determined as follows:

$$\text{floor}\left[\text{floor}(UE\_ID/N_n)/(Ns/m)\right] \mod \left(\sum\nolimits_{p=1}^{m} G_{np}\right),$$

where UE_ID denotes an identity of the first terminal device, $N_n$ denotes a quantity of paging frames in a paging cycle corresponding to paging of the $n^{th}$ group, Ns denotes a quantity of POs in one paging frame, m denotes a quantity of POs indicated in one PEI, m is a positive integer, $G_{np}$ denotes a quantity of subgroups, having a same type as the $n^{th}$ subgroup, in a $p^{th}$ PO of POs indicated in the first PEI, 1≤p≤m, n is 1 or 2, floor denotes a floor operation, and mod denotes a modulo operation.

In some embodiments, a sequence number of an $n^{th}$ subgroup is determined as follows:

$$\text{Floor}[\text{Floor}(UE\_ID/N_n)/(Ns/m)]\text{Mod}(m*G_n),$$

where UE_ID denotes an identity of the first terminal device, $N_n$ denotes a quantity of paging frames in a paging cycle corresponding to paging of the $n^{th}$ group, Ns denotes a quantity of POs in one paging frame, m denotes a quantity of POs indicated in one PEI, m is a positive integer, $G_n$ denotes a quantity of subgroups, having a same type as the $n^{th}$ subgroup, in one PO, n is 1 or 2, floor denotes a floor operation, and mod denotes a modulo operation.

In some embodiments, the transmitting module 1310 is further configured to transmit first indication information to the first terminal device, where the first indication information is used to instruct the first terminal device to enable or disable a PEI.

In some embodiments, the first indication information is carried in one or more of: a system message, MAC layer signalling, RRC signalling, DCI, or NAS signalling.

In some embodiments, the first terminal device is a terminal device in an RRC inactive state.

Figure 14:
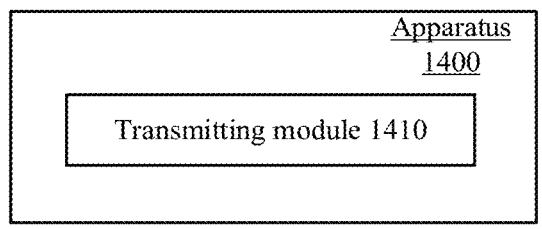
FIG. 14 is a schematic structural diagram of a wireless communications apparatus according to still another embodiment of the present application.

FIG. 14 is a schematic structural diagram of a wireless communications apparatus according to another embodiment of the present application. A wireless communications apparatus 1400 in FIG. 14 may be a base station. The wireless communications apparatus 1400 includes a transmitting module 1410.

The transmitting module 1410 is configured to transmit a first PEI, where the first PEI is used to indicate whether to perform paging detection by at least one subgroup, and the at least one subgroup includes a first subgroup. A sequence number of the first subgroup is determined based on at least one of: an ID of the first terminal device, an indication from a base station, or an indication from a core network device.

In some embodiments, the sequence number of the first subgroup is determined as follows:

$$\text{floor}\left[\text{floor}(UE\_ID/N)/(Ns/m)\right] \mod \left(\sum\nolimits_{p=1}^{m} G_p\right),$$

where UE_ID denotes an identity of the first terminal device, N denotes a quantity of paging frames in a paging cycle, Ns denotes a quantity of paging occasions in one paging frame, m denotes a quantity of POs indicated in one PEI, m is a positive integer, $G_p$ denotes a quantity of subgroups, having a same type as the first subgroup, in a $p^{th}$ PO of POs indicated in the first PEI, 1≤p≤m, floor denotes a floor operation, and mod denotes a modulo operation.

In some embodiments, the sequence number of the first subgroup is determined as follows:

$$\text{floor}[\text{floor}(UE\_ID/N)/(Ns/m)]\bmod(m*G),$$

where UE_ID denotes an identity of the first terminal device, N denotes a quantity of paging frames in a paging cycle, Ns denotes a quantity of paging occasions in one paging frame, m denotes a quantity of POs indicated in one PEI, m is a positive integer, G denotes a quantity of subgroups, having a same type as the first subgroup, in one PO, floor denotes a floor operation, and mod denotes a modulo operation.

In some embodiments, the sequence number of the first subgroup is determined based on RRC signalling or NAS signalling.

In some embodiments, a terminal device is grouped in the first subgroup based on a service type of the terminal device and/or an oftenness of paging the terminal device.

In some embodiments, the service type includes one or more of the following: cMBB, uRLLC, or mMTC.

Figure 15:
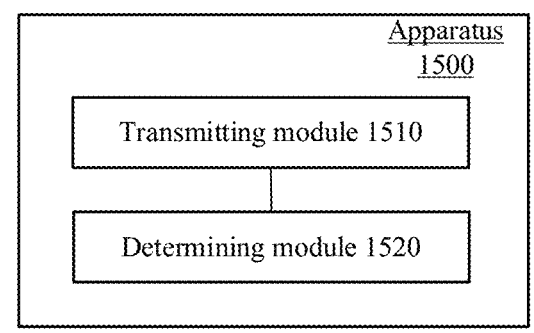
FIG. 15 is a schematic structural diagram of a wireless communications apparatus according to still another embodiment of the present application.

FIG. 15 is a schematic structural diagram of a wireless communications apparatus according to another embodiment of the present application. A wireless communications apparatus 1500 in FIG. 15 may be a base station. The wireless communications apparatus 1500 includes a transmitting module 1510 and a determining module 1520.

The transmitting module 1510 is configured to transmit a first PEI, where the first PEI includes a plurality of pieces of indication information. The plurality of pieces of indication information are respectively used to indicate whether to perform paging detection by a plurality of subgroups, and the first terminal device belongs to the plurality of subgroups.

The determining module 1520 is configured to determine to perform paging detection by the first terminal device in one or more POs corresponding to the plurality of pieces of indication information, in a case that one of the plurality of pieces of indication information indicates performing paging detection by the first terminal device.

In some embodiments, the plurality of POs includes a PO corresponding to a RAN-initiated paging message and a PO corresponding to a CN-initiated PO.

In some embodiments, the first terminal device is a terminal device in an RRC active state.

Figure 16:
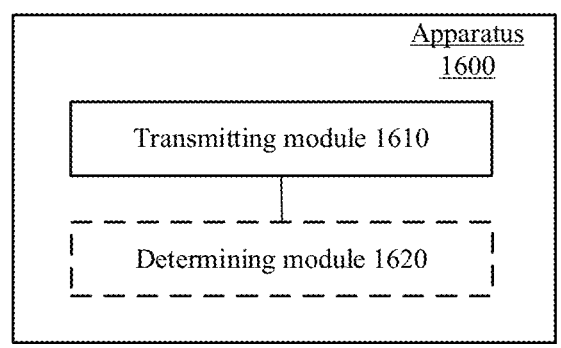
FIG. 16 is a schematic structural diagram of a wireless communications apparatus according to still another embodiment of the present application.

FIG. 16 is a schematic structural diagram of a wireless communications apparatus according to another embodiment of the present application. A wireless communications apparatus 1600 in FIG. 16 may be a base station. The wireless communications apparatus 1600 includes a transmitting module 1610.

The transmitting module 1610 is configured to transmit first indication information to a first terminal device, where the first indication information is used to instruct to enable or disable a PEI.

In some embodiments, the apparatus 1600 further includes a determining module 1620, determining to detect the PEI by the first terminal device, in a case that the first indication information instructs to enable the PEI; determining not to detect the PEI by the first terminal device, in a case that the first indication information instructs to disable the PEI.

Figure 17:
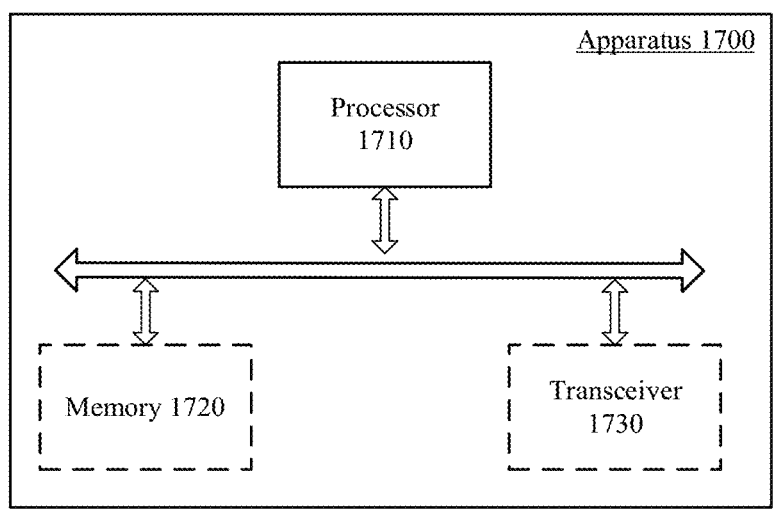
FIG. 17 is a schematic structural diagram of an apparatus according to an embodiment of the present application.

FIG. 17 is a schematic structural diagram of an apparatus according to an embodiment of the present application. Dashed lines in FIG. 17 indicate that a unit or module is optional. The apparatus 1700 may be configured to implement the methods described in the foregoing method embodiments. The apparatus 1700 may be a chip, a terminal device, or a network device.

The apparatus 1700 may include one or more processors 1710. The processor 1710 may support the apparatus 1700 to implement the methods described in the foregoing method embodiments. The processor 1710 may be a general-purpose processor or a dedicated processor. For example, the processor may be a central processing unit (central processing unit, CPU). Alternatively, the processor may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1700 may further include one or more memories 1720. The memory 1720 stores a program that may be executed by the processor 1710, so that the processor 1710 performs the methods described in the foregoing method embodiments. The memory 1720 may be independent of or integrated into the processor 1710.

The apparatus 1700 may further include a transceiver 1730. The processor 1710 may communicate with another device or chip by using the transceiver 1730. For example, the processor 1710 may transmit and receive data to and from another device or chip by using the transceiver 1730.

An embodiment of the present application further provides a computer-readable storage medium for storing a program. The computer-readable storage medium may be applied to the wireless communications apparatus provided in the embodiments of the present application, and the program causes a computer to execute the methods that are performed by the terminal device or the base station in various embodiments of the present application.

An embodiment of the present application further provides a computer program product. The computer program product includes a program. The computer program product may be applied to the terminal device or the network device provided in the embodiments of the present application, and the program causes a computer to execute the methods that are performed by the terminal device or the base station in various embodiments of the present application.

An embodiment of the present application further provides a computer program. The computer program may be applied to the terminal device or the network device provided in the embodiments of the present application, and the computer program causes a computer to execute the methods that are performed by the terminal device or the base station in various embodiments of the present application.

It should be understood that, in embodiments of the present application, "B that is corresponding to A" means that B is associated with A, and B may be determined based on A. However, it should also be understood that, determining B based on A does not mean determining B based only on A, but instead B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

It should be understood that, in embodiments of the present application, sequence numbers of the foregoing processes do not mean execution sequences. The execution sequences of the processes should be determined based on functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections implemented through some interfaces, apparatus or units, and may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of embodiments.

In addition, function units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:
receiving, by a first terminal device from a base station, a first paging early indication (PEI), wherein the first terminal device belongs to a first subgroup and a second subgroup, and the first PEI comprises an indication indicating whether to perform paging detection by the first subgroup and whether to perform paging detection based on the second subgroup, wherein the first PEI indicates a quantity of paging occasions (POs);
determining, by the first terminal device based on the indication, to perform paging detection based on at least one of the first subgroup or the second subgroup, wherein the first subgroup corresponds to a radio access network (RAN)-initiated paging message, and the second subgroup corresponds to a core network (CN)-initiated paging message, wherein a sequence number of an $n^{th}$ subgroup is determined by the first terminal device based on a first value mod a second value, n is 1 or 2, the first value is determined by the first terminal device based on an identity of the first terminal device, and the second value is determined by the first terminal device based on the quantity of POs indicated in the first PEI, and mod denotes a modulo operation; and
performing, by the first terminal device, paging detection based on the determining.

2. The method according to claim 1, wherein
when the first PEI indicates performing paging detection based on at least one of the first subgroup or the second subgroup, performing, by the first terminal device, paging detection; or
when the first PEI indicates not performing paging detection based on the first subgroup and not performing paging detection based on the second subgroup, skipping, by the first terminal device, paging detection.

3. The method according to claim 1, wherein the first subgroup corresponds to a first paging occasion (PO), the second subgroup corresponds to a second PO, the second PO is different from the first PO.

4. The method according to claim 1, wherein a sequence number of the first subgroup is determined based on radio resource control (RRC) signalling or non-access stratum (NAS) signalling.

5. The method according to claim 1, wherein the sequence number of the $n^{th}$ subgroup is determined as follows:

$$\text{floor}\left[\text{floor}(UE\_ID/N_n)/(Ns/m)\right]\text{mod}\left(\sum\nolimits_{p=1}^{m} G_{np}\right),$$

wherein UE_ID denotes an identity of the first terminal device, $N_n$ denotes a quantity of paging frames in a paging cycle corresponding to paging of the $n^{th}$ subgroup, Ns denotes a quantity of POs in one paging frame, m denotes a quantity of POs indicated in the first PEI, m is a positive integer, $G_{np}$ denotes a quantity of subgroups, having a same type as the $n^{th}$ subgroup, in a $p^{th}$ PO of POs indicated in the first PEI, $1 \leq p \leq m$, n is 1 or 2, floor denotes a floor operation, and mod denotes a modulo operation.

6. The method according to claim 1, wherein the sequence number of the $n^{th}$ subgroup is determined as follows:

$$\text{floor}[\text{floor}(UE\_ID/N_n)/(Ns/m)]\text{mod}(m*G_n),$$

wherein UE_ID denotes an identity of the first terminal device, $N_n$ denotes a quantity of paging frames in a paging cycle corresponding to paging of the $n^{th}$ subgroup, Ns denotes a quantity of POs in one paging frame, m denotes a quantity of POs indicated in one PEI, m is a positive integer, $G_n$ denotes a quantity of subgroups, having a same type as the $n^{th}$ subgroup, in one PO, n is 1 or 2, floor denotes a floor operation, and mod denotes a modulo operation.

7. The method according to claim 1, wherein the method further comprises:
receiving, by the first terminal device, first indication information, wherein the first indication information is used to instruct the first terminal device to enable or disable a PEI; and
the receiving, by a first terminal device, a first PEI comprises:
when the first indication information instructs the first terminal device to enable the PEI, receiving, by the first terminal device, the first PEI; or
when the first indication information instructs the first terminal device to disable the PEI, skipping, by the first terminal device, receiving of the first PEI.

8. A wireless communication method, comprising:
receiving, by a first terminal device from a base station, a first paging early indication (PEI), wherein the first PEI indicates to perform paging detection by at least one subgroup, and the at least one subgroup comprises a first subgroup, wherein the first PEI indicates a quantity of paging occasions (POs);
wherein a sequence number of the first subgroup is determined by the first terminal device based on at least one of: an identity (ID) of the first terminal device, an indication from the base station, or an indication from a core network device, wherein the sequence number of the first subgroup is determined by the first terminal device based on a first value mod a second value, the first value is determined by the first terminal device based on the ID of the first terminal device, and the second value is determined by the first terminal device based on the quantity of POs indicated in the first PEI, and mod denotes a modulo operation; and
performing, by the first terminal device, paging detection based on the first PEI.

9. The method according to claim 8, wherein the sequence number of the first subgroup is determined as follows:

$$\text{floor}[\text{floor}(UE\_ID/N)/(Ns/m)] \bmod \left(\sum_{p=1}^{m} G_p\right),$$

wherein UE_ID denotes an identity of the first terminal device, N denotes a quantity of paging frames in a paging cycle, Ns denotes a quantity of paging occasions in one paging frame, m denotes a quantity of POs indicated in one PEI, m is a positive integer, $G_p$ denotes a quantity of subgroups, having a same type as the first subgroup, in a $p^{th}$ PO of POs indicated in the first PEI, $1 \leq p \leq m$, floor denotes a floor operation, and mod denotes a modulo operation.

10. The method according to claim 8, wherein the sequence number of the first subgroup is determined as follows:

$$\text{floor}[\text{floor}(UE\_ID/N)/(Ns/m)]\text{mod}(m*G),$$

wherein UE_ID denotes an identity of the first terminal device, N denotes a quantity of paging frames in a paging cycle, Ns denotes a quantity of paging occasions in one paging frame, m denotes a quantity of POs indicated in one PEI, m is a positive integer, G denotes a quantity of subgroups, having a same type as the first subgroup, in one PO, floor denotes a floor operation, and mod denotes a modulo operation.

11. The method according to claim 8, wherein the sequence number of the first subgroup is determined based on radio resource control (RRC) signalling or non-access stratum (NAS) signalling.

12. A first terminal device, comprising:
at least one processor;
one or more non-transitory computer-readable storage media coupled to the at least one processor and storing programming instructions for execution by the at least one processor, wherein the programming instructions, when executed, cause the first terminal device to perform operations comprising:
receiving, from a base station, a first paging early indication (PEI), wherein the first terminal device belongs to a first subgroup and a second subgroup, and the first PEI comprises an indication indicating whether to perform paging detection by the first subgroup and whether to perform paging detection based on the second subgroup, wherein the first PEI indicates a quantity of paging occasions (POs);
determining, based on the indication, to perform paging detection based on at least one of the first subgroup or the second subgroup, wherein the first subgroup corresponds to a radio access network (RAN)-initiated paging message, and the second subgroup corresponds to a core network (CN)-initiated paging message, wherein a sequence number of an $n^{th}$ subgroup is determined by the first terminal device based on a first value mod a second value, n is 1 or 2, the first value is determined by the first terminal device based on an identity of the first terminal device, and the second value is determined by the first terminal device based on the quantity of POs indicated in the first PEI, and mod denotes a modulo operation; and
performing paging detection based on the determining.

13. The first terminal device according to claim 12, wherein
when the first PEI indicates performing paging detection based on at least one of the first subgroup or the second subgroup, performing, by the first terminal device, paging detection; or
when the first PEI indicates not performing paging detection based on the first subgroup and not performing paging detection based on the second subgroup, skipping, by the first terminal device, paging detection.

14. The first terminal device according to claim 12, wherein the first subgroup corresponds to a first paging occasion (PO), the second subgroup corresponds to a second PO, the second PO is different from the first PO.

15. The first terminal device according to claim 12, wherein a sequence number of the first subgroup is determined based on radio resource control (RRC) signalling or non-access stratum (NAS) signalling.

16. The first terminal device according to claim 12, wherein the sequence number of the $n^{th}$ subgroup is determined as follows:

$$\text{floor}[\text{floor}(UE\_ID/N_n)/(Ns/m)] \bmod \left(\sum_{p=1}^{m} G_{np}\right),$$

wherein UE_ID denotes an identity of the first terminal device, $N_n$ denotes a quantity of paging frames in a paging cycle corresponding to paging of the $n^{th}$ subgroup, Ns denotes a quantity of POs in one paging frame, m denotes a quantity of POs indicated in the first PEI, m is a positive integer, $G_{np}$ denotes a quantity of subgroups, having a same type as the $n^{th}$ subgroup, in a $p^{th}$ PO of POs indicated in the first PEI, $1 \leq p \leq m$, n is 1 or 2, floor denotes a floor operation, and mod denotes a modulo operation.

17. The first terminal device according to claim 12, wherein the sequence number of the $n^{th}$ subgroup is determined as follows:

$$\text{floor}[\text{floor}(UE\_ID/N_n)/(Ns/m)] \bmod(m*G_n),$$

wherein UE_ID denotes an identity of the first terminal device, $N_n$ denotes a quantity of paging frames in a paging cycle corresponding to paging of the $n^{th}$ subgroup, Ns denotes a quantity of POs in one paging frame, m denotes a quantity of POs indicated in one PEI, m is a positive integer, $G_n$ denotes a quantity of subgroups, having a same type as the $n^{th}$ subgroup, in one PO, n is 1 or 2, floor denotes a floor operation, and mod denotes a modulo operation.

18. The first terminal device according to claim 12, wherein the operations further comprise:
receiving first indication information, wherein the first indication information is used to instruct the first terminal device to enable or disable a PEI; and
the receiving a first PEI comprises:
when the first indication information instructs the first terminal device to enable the PEI, receiving, by the first terminal device, the first PEI; or
when the first indication information instructs the first terminal device to disable the PEI, skipping, by the first terminal device, receiving of the first PEI.

* * * * *